United States Patent
Tanaka

(10) Patent No.: US 10,657,407 B2
(45) Date of Patent: May 19, 2020

(54) IMAGE PROCESSING APPARATUS, IMAGE PROCESSING METHOD, AND RECORDING MEDIUM

(71) Applicant: Kyocera Document Solutions Inc., Osaka (JP)

(72) Inventor: Kunihiko Tanaka, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 116 days.

(21) Appl. No.: 16/041,684

(22) Filed: Jul. 20, 2018

(65) Prior Publication Data

US 2019/0026590 A1 Jan. 24, 2019

(30) Foreign Application Priority Data

Jul. 20, 2017 (JP) .................................. 2017-141383
Jul. 20, 2017 (JP) .................................. 2017-141384

(51) Int. Cl.
| | |
|---|---|
| *G06K 9/46* | (2006.01) |
| *H04N 19/159* | (2014.01) |
| *H04N 19/182* | (2014.01) |
| *G06K 9/00* | (2006.01) |
| *H04N 19/513* | (2014.01) |
| *G06K 9/32* | (2006.01) |
| *H04N 19/176* | (2014.01) |
| *G06F 16/70* | (2019.01) |

(52) U.S. Cl.
CPC ............... *G06K 9/46* (2013.01); *G06F 16/70* (2019.01); *G06K 9/00221* (2013.01); *G06K 9/00288* (2013.01); *G06K 9/00664* (2013.01); *G06K 9/3233* (2013.01); *H04N 19/159* (2014.11); *H04N 19/176* (2014.11); *H04N 19/182* (2014.11); *H04N 19/513* (2014.11)

(58) Field of Classification Search
CPC .............................. G06K 9/46; G06K 9/00664
USPC .......... 348/169, 50; 382/195, 220, 201, 107, 382/154
See application file for complete search history.

(56) References Cited

U.S. PATENT DOCUMENTS

| | | | | |
|---|---|---|---|---|
| 2006/0251328 | A1* | 11/2006 | Boo ................... | G06K 9/00711 382/220 |
| 2016/0073095 | A1* | 3/2016 | Ogura ................. | H04N 13/282 348/50 |

FOREIGN PATENT DOCUMENTS

| | | |
|---|---|---|
| JP | 2005-080061 A | 3/2005 |
| JP | 2007-082240 A | 3/2007 |

* cited by examiner

*Primary Examiner* — Kiet M Doan
(74) *Attorney, Agent, or Firm* — James Judge

(57) ABSTRACT

An image processing apparatus includes a still image data creation unit and a still image data extraction unit. The still image data extraction unit calculates a first feature value of the sampling target still image data, determines whether the sampling target still image data is first extraction target still image data as an extraction target based on the first feature value, and calculates a second feature value of adjacent still image data. The adjacent still image data are a plurality of still image data in a range preset in time series of the first extraction target still image data. The still image data extraction unit determines whether the adjacent still image data is second extraction target still image data as an extraction target or not based on the second feature value and extracts the first extraction target still image data and the second extraction target still image data.

13 Claims, 21 Drawing Sheets

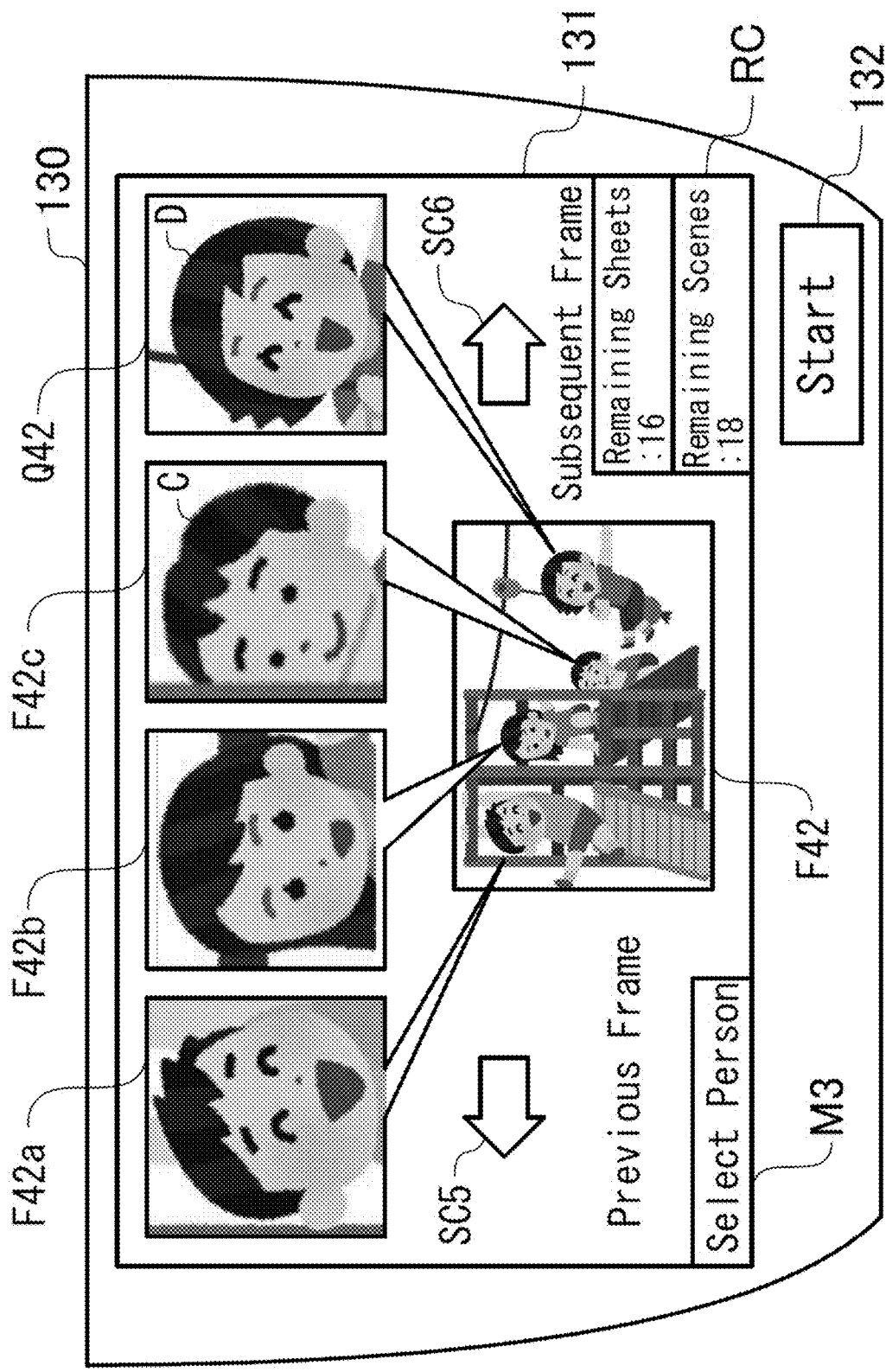

FIG. 18
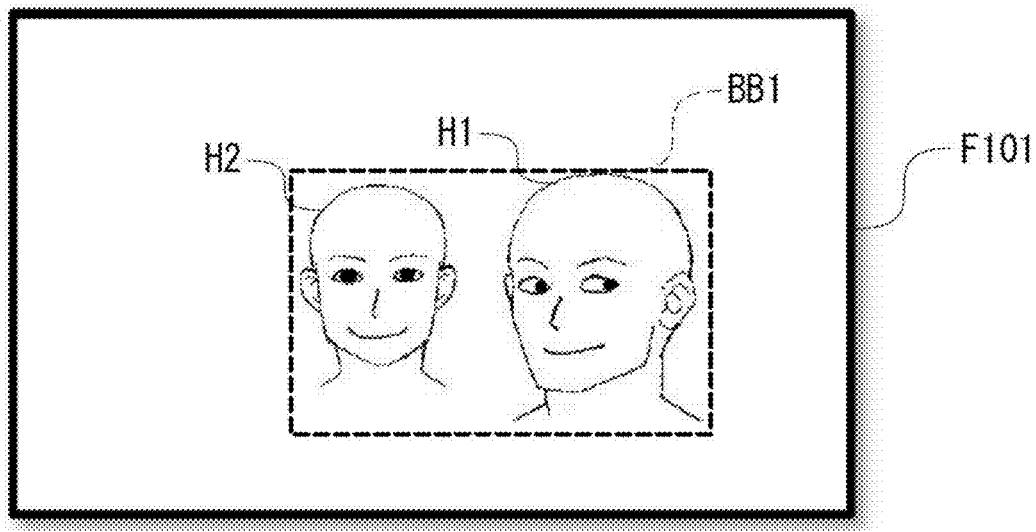
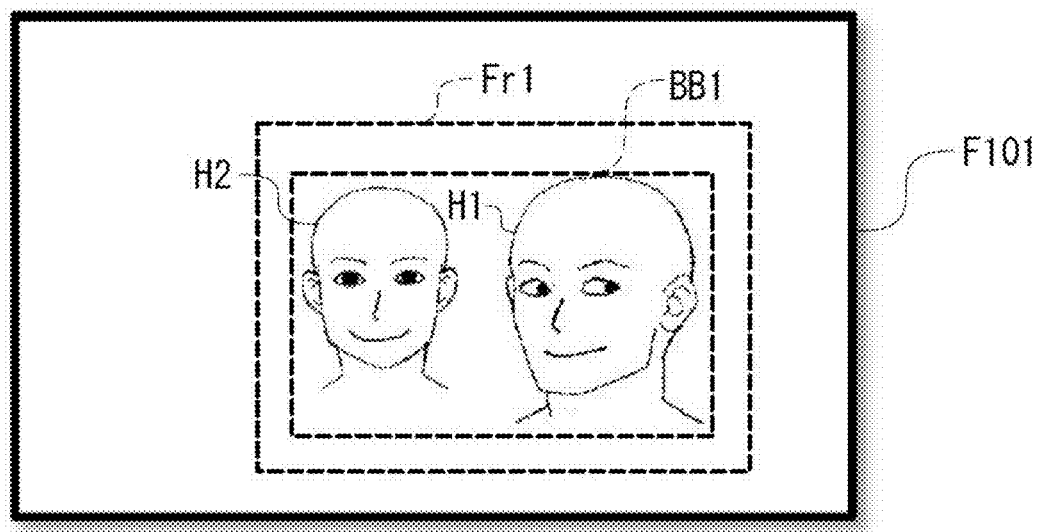

FIG. 19
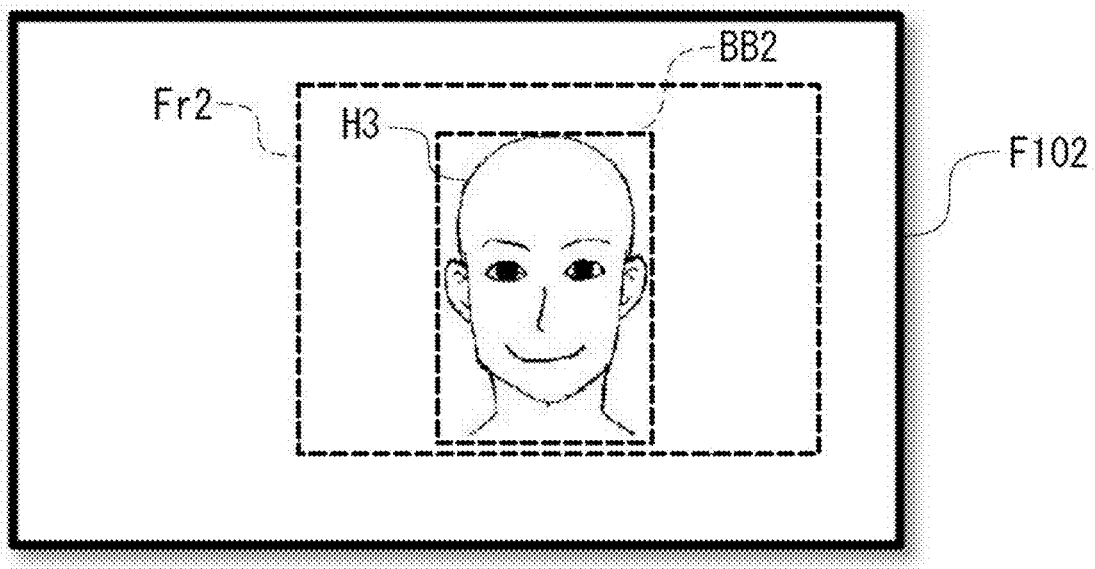
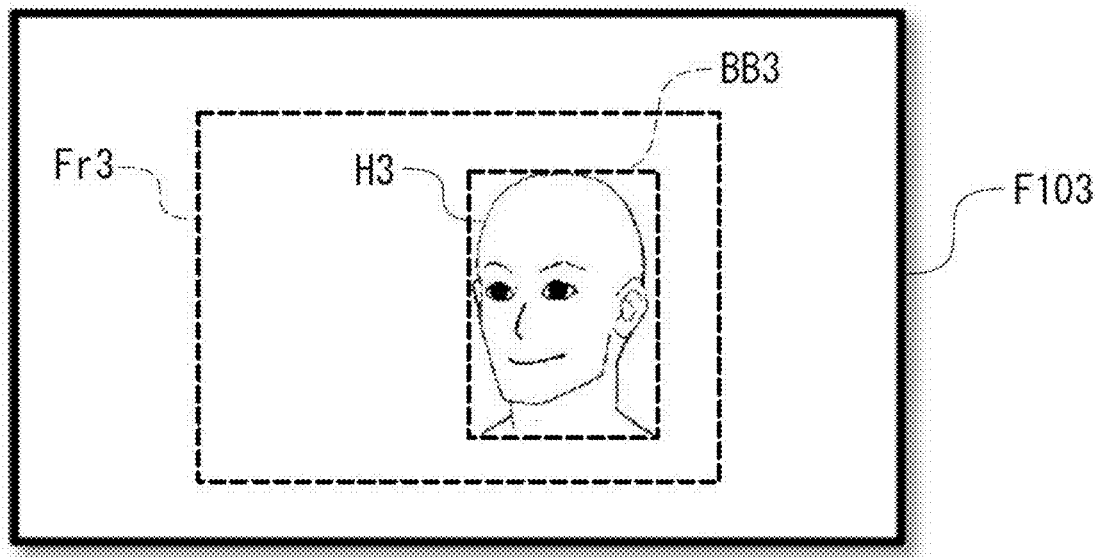

IMAGE PROCESSING APPARATUS, IMAGE PROCESSING METHOD, AND RECORDING MEDIUM

INCORPORATION BY REFERENCE

This application is based upon, and claims the benefit of priority from, corresponding Japanese Patent Application Nos. 2017-141383 and 2017-141384, each filed in the Japan Patent Office on Jul. 20, 2017, and the entire contents of which are incorporated herein by reference.

BACKGROUND

Unless otherwise indicated herein, the description in this section is not prior art to the claims in this application and is not admitted to be prior art by inclusion in this section.

Recently, in association with performance improvement and image quality improvement of a video camera and a smart phone, still image data extractable from moving image data has been created. A technique based on such situation that extracts desired still images from moving image data to ensure creating an album and the like has also been proposed. For example, a technique that grasps a change in a capture situation of moving image data from a variation characteristic of a feature value included in a frame image of the moving image data and selects and displays this frame image indicating the change has been proposed. Meanwhile, there has been also proposed a technique that determines a count of frame image data to create a still image based on an amount of motion detected from each frame image to create a high-resolution still image based on data of a plurality of frame images constituting a moving image. This technique ensures reducing a processing load in addition to creating the still image from the moving image with an appropriate image quality.

SUMMARY

An image processing apparatus according to one aspect of the disclosure includes a still image data creation unit and a still image data extraction unit. The still image data creation unit performs a sampling from moving image data at a predetermined sampling period to create sampling target still image data. The still image data extraction unit calculates a first feature value of the sampling target still image data, determines whether the sampling target still image data is first extraction target still image data as an extraction target or not based on the first feature value, and calculates a second feature value of adjacent still image data. The adjacent still image data are a plurality of still image data in a range preset in time series of the first extraction target still image data. The still image data extraction unit determines whether the adjacent still image data is second extraction target still image data as an extraction target or not based on the second feature value and extracts the first extraction target still image data and the second extraction target still image data.

An image processing apparatus according to another aspect of the disclosure includes a still image data creation unit and a still image data extraction unit. The still image data creation unit creates a plurality of pieces of still image data from moving image data. The still image data extraction unit detects a candidate region as a region having a predetermined feature in the still image data, calculates a feature value of the at least one detected candidate region, and extracts the still image data including the candidate region having the feature value exceeding a predetermined threshold.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 17A and 17B illustrate an operation display screen in the print layout setting process according to the fourth embodiment.

FIG. 18 illustrates an example of the print layout setting process according to the fourth embodiment.

FIG. 19 illustrates another example of the print layout setting process according to the fourth embodiment.

DETAILED DESCRIPTION

Figure 1:
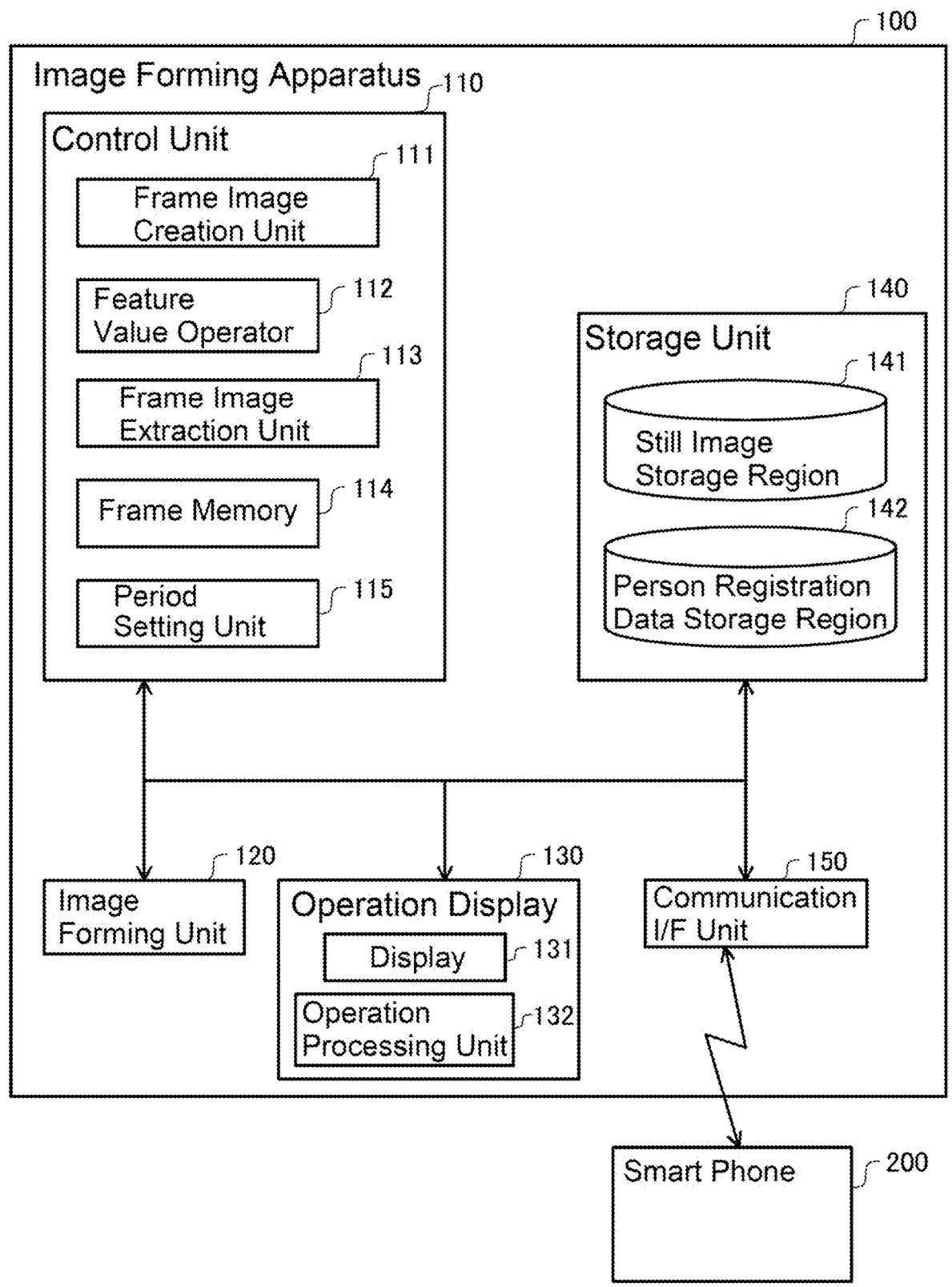
FIG. 1 illustrates a block diagram illustrating a functional configuration of an image forming apparatus according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes configurations for implementing the disclosure (hereinafter referred to as "embodiments") in the following order with reference to the drawings.

A. First Embodiment
B. Second Embodiment
C. Third Embodiment
D. Fourth Embodiment
E. Modification

A. First Embodiment

FIG. 1 illustrates a block diagram illustrating a functional configuration of an image forming apparatus 100 according to the first embodiment of the disclosure. The image forming apparatus 100 includes a control unit 110, an image forming unit 120, an operation display 130, a storage unit 140, and a communication interface unit 150 (also referred to as a communication I/F unit). The image forming apparatus 100 is connected to a smart phone 200 by short range wireless communications via the communication interface unit 150. Accordingly, the image forming apparatus 100 can receive moving image data imaged and created by the smart phone 200.

This embodiment uses BLUETOOTH (registered trademark) CLASS 2 for the short range wireless communications. The BLUETOOTH (registered trademark) CLASS 2 is the short range wireless communications that performs communications with an output of 2.5 mW and can communicate between the image forming apparatus 100 and the smart phone 200 at a distance around within 10 m.

The control unit 110 includes a main storage unit such as a RAM and a ROM and a controller such as a microprocessing unit (MPU) and a central processing unit (CPU). The control unit 110 has a controller function related to interfaces, various I/Os, a universal serial bus (USB), a bus, and another hardware. The control unit 110 controls the entire image forming apparatus 100.

The control unit 110 includes a frame image creation unit 111, a feature value operator 112, a frame image extraction unit 113 a frame memory 114, and a period setting unit 115. The image forming unit 120 forms an image on a print medium.

The operation display 130 includes a display 131 and an operation processing unit 132. The display 131 functions as a touch panel and displays various menus as an input screen. The operation processing unit 132 includes a start button and accepts an operation input from a user.

The storage unit 140 is a storage device constituted of a hard disk drive, a flash memory, and a similar memory as a non-transitory recording medium and stores control programs and data of processes each performed by the control unit 110. The storage unit 140 further includes a still image storage region 141 to store frame image data and a person registration data storage region 142 in which face image data (also referred to as registered face image data) to detect a face of a person is registered. The person registration data storage region 142 also stores data expressing a threshold to extract the frame image data according to a general detection of a face.

Figure 2:
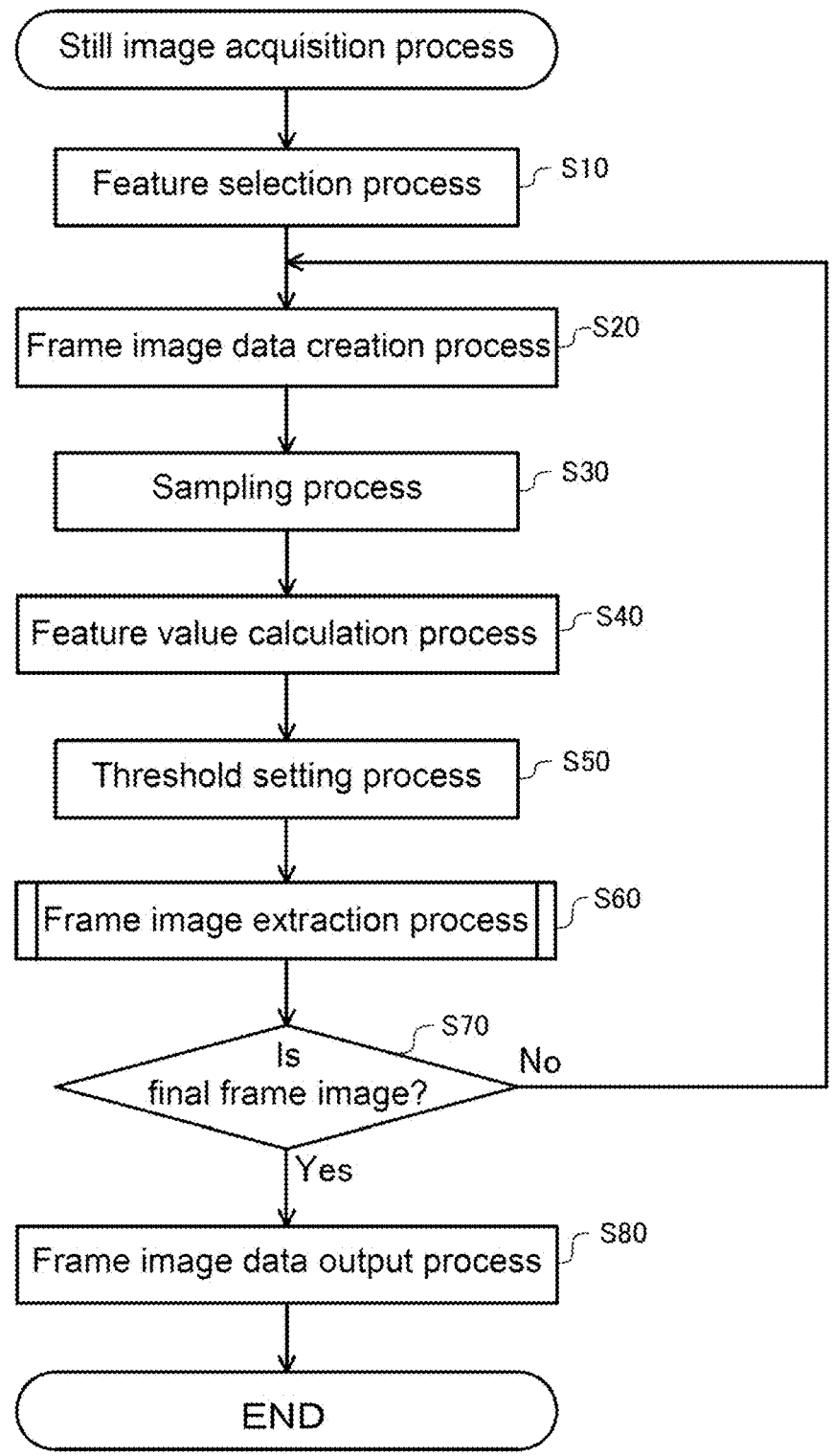
FIG. 2 illustrates contents of a still image acquisition process according to the first embodiment.

FIG. 2 illustrates contents of a still image acquisition process according to the first embodiment. At Step S10, the user performs a feature selection process using the operation display 130. In the feature selection process, the user can select a kind of a feature value to be detected in the still image as an extraction target as a condition when the still image data is extracted from the moving image data.

The kinds of the feature value include kinds such as a feature value for face detection and a feature value to detect a specific person. The feature value for face detection can quantitatively express simply, for example, a large display of a face of a human. The feature value to detect the specific person can, for example, identify the specific person among other persons and quantitatively express a large display of the face of the specific human. A method for registering the feature value to detect the specific person will be described in detail in a third embodiment.

Then, the period setting unit 115 causes the operation display 130 to display an operation display screen (not illustrated), which accepts a period setting input as a setting of a sampling period, a temporal sampling interval of the frame image. This allows the user to set the sampling period.

At Step S20, the frame image creation unit 111 in the control unit 110 functions as a still image data creation unit to perform a frame image data creation process. In the frame image data creation process, the frame image creation unit 111 creates the frame image data from moving image data MD at a frame rate of, for example, 30 fps.

Figure 3:
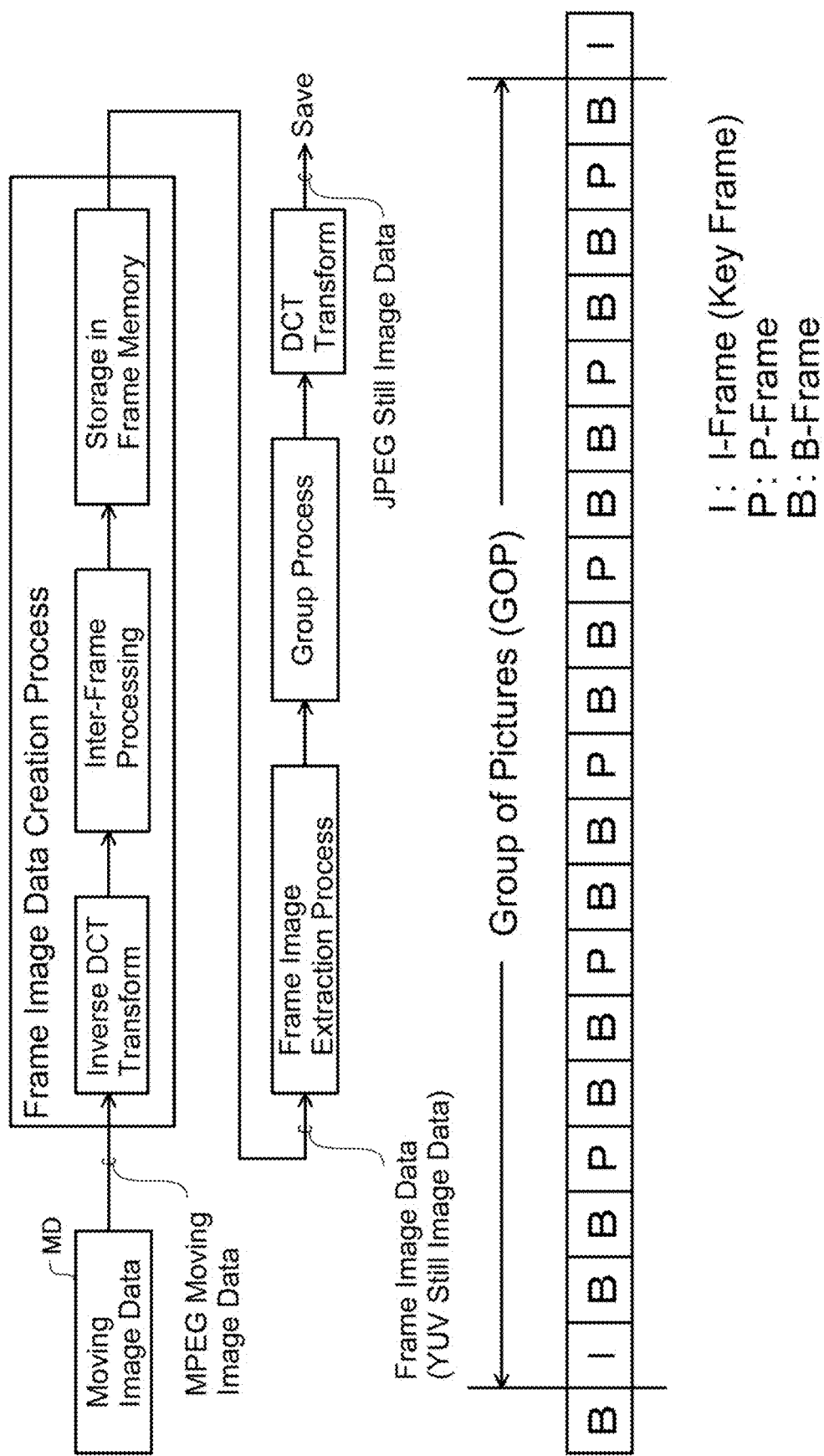
FIG. 3 illustrates a data flow diagram illustrating contents of a frame image data creation process according to the first embodiment.

FIG. 3 illustrates a data flow diagram illustrating contents of the frame image data creation process according to the first embodiment. FIG. 3 illustrates the data flow diagram on the upper side and illustrates a group of pictures (GOP) on the lower side. The data flow diagram illustrates a flow of the frame image data from the moving image data MD. The frame image data is constituted as YUV image data. The frame image data creation process is a process in which the frame image creation unit 111 extracts a plurality of frame image data from the moving image data MD.

The frame image data creation process includes a process defined in, for example, MPEG-4 (ISO/IEC 14496) and H.264. In the frame image data creation process, the frame image creation unit 111 creates the frame image data from intra-coded frames (I-frames), predicted frames (P-frames), and bi-directional predicted frames (B-frames).

The I-frame is a frame encoded without use of inter-frame prediction. The I-frame is also referred to as an intra-frame and a key frame. The I-frames constitute the GOP together with the predicted frames (P-frames) and the bi-directional predicted frames (B-frames). The P-frames ensure creating the frame image data by inter-frame processing with the I-frames and the P-frames. The B-frames ensure creating the frame image data by the inter-frame processing with the I-frames, the P-frames, and the other previous and subsequent B-frames.

The moving image data is created from the plurality of frame image data arrayed in a time series order. The plurality of frame image data are often approximated between the previous and the subsequent frames in time series. The inter-frame prediction is a technique that predicts the current frame image from the frame image previous in time series using characteristics of such moving image data.

Specifically, the inter-frame prediction is a technique that estimates a movement of every pixel block, performs a DCT transform on a difference of the pixel blocks between the frames after the movement, and quantizes the value to raise a compression ratio in units of the GOPs. The P-frame can be reproduced from the I-frame using a motion vector. The motion vector is a movement vector of each pixel block.

The frame image creation unit 111 performs an inverse discrete cosine transform (also referred to as an inverse DCT transform) on the I-frames to create the frame image data as the YUV image data including luminance data and color difference data. The inverse DCT transform is performed, for example, every 8×8 pixels or 16×16 pixel blocks. The frame image creation unit 111 stores the reproduced frame image data in the frame memory 114 in the control unit 110.

The frame image creation unit 111 performs the inverse discrete cosine transform on the P-frames and the B-frames to create difference data. The frame image creation unit 111 performs the inter-frame processing using the difference data and the motion vectors to create the frame image data. The motion vector is data created during the encoding of the moving image data MD. This process is a usual decoding process defined in MPEG-4 and H.264.

The frame image creation unit 111 performs the frame image data creation process based on the P-frames and the B-frames and stores all frame image data in the frame memory 114. When storing the frame image data in the frame memory 114, the frame image creation unit 111 stores a number expressing the time series order of the frame image data associated with each frame image data.

Figure 4:
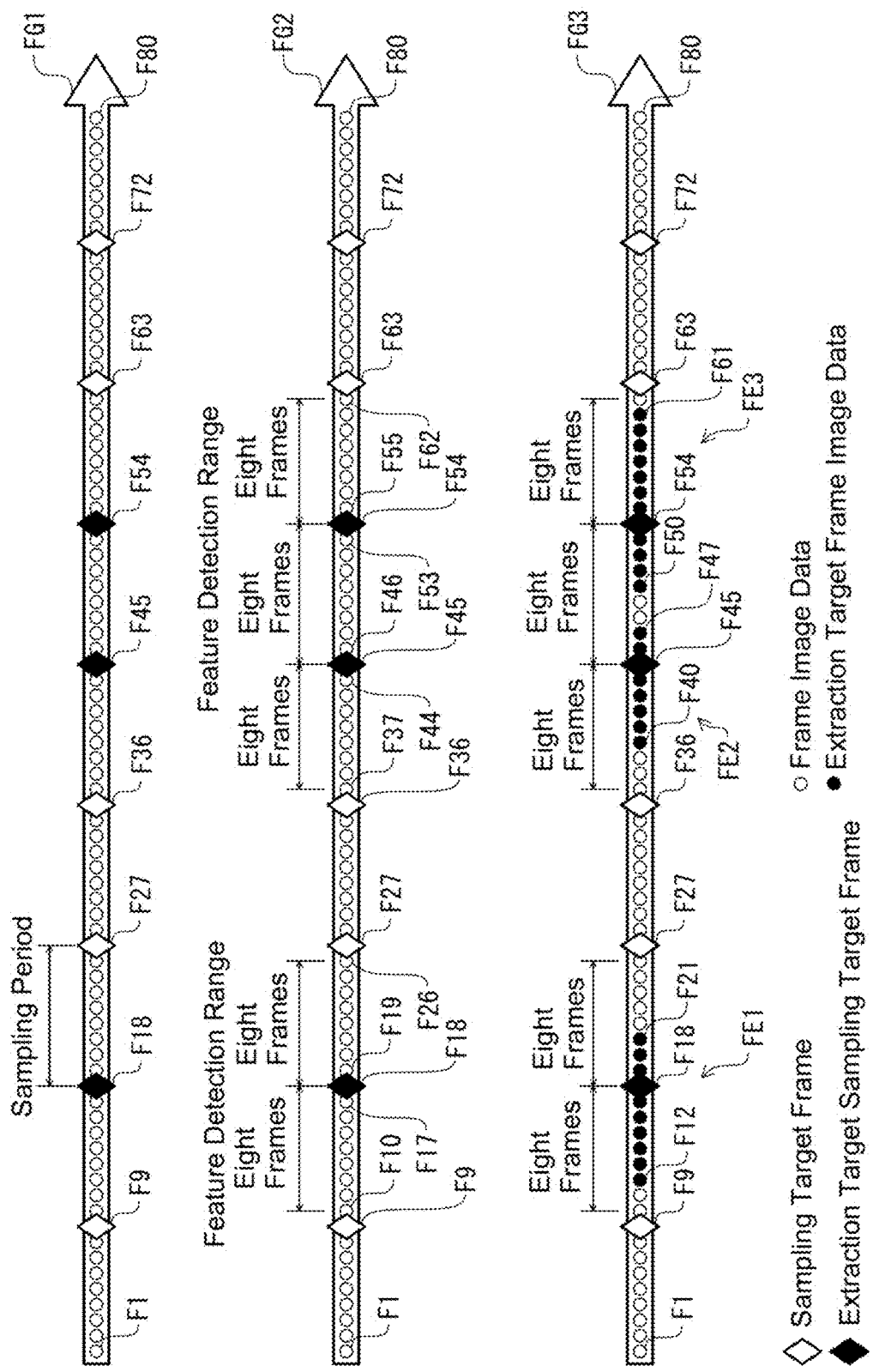
FIG. 4 illustrates an outline of a frame image extraction process according to the first embodiment.

FIG. 4 illustrates an outline of a frame image extraction process according to the first embodiment. FIG. 4 illustrates a first frame image group FG1, a second frame image group FG2, and a third frame image group FG3. The first frame image group FG1 indicates 80 frame image data F1 to F80 as the processing target. The second frame image group FG2 indicates the frame image data F1 to F80 in a sampling process. The third frame image group FG3 indicates the frame image data F1 to F80 after completion of the frame image extraction process.

At Step S30, the frame image creation unit 111 performs the sampling process. In this embodiment, it is assumed that the feature value operator 112 determines the sampling target frames at the sampling period (0.27 seconds at 30 fps) at intervals of eight frames based on the user's selection. The sampling target frames in this example are the eight frame image data F9, F18, F27, F36, F45, F54, F63, and F72, which are expressed by diamond symbols in the first frame image group FG1. The image data of the sampling target frames are also referred to as sampling target still image data.

At Step S40, the feature value operator 112 in the control unit 110 performs a feature value calculation process. In the feature value calculation process, the feature value operator 112 calculates the feature value based on the kind of the selected feature value. The feature value operator 112 can detect and identify a person using, for example, the well-known Open Source Computer Vision Library (OpenCV). The feature value of the sampling target still image data is also referred to as a first feature value.

Specifically, the feature value operator 112 calculates the feature value quantitatively expressing a feature of a specific person based on the registered face image data, which is registered in the person registration data storage region 142 and, for example, a histograms of oriented gradients (HOG) feature and a Haar-like feature. Machine learning such as support vector machine (SVM) is applicable to the calculation of the feature value.

At Step S50, the frame image extraction unit 113 performs a threshold setting process. In the threshold setting process, the frame image extraction unit 113 reads data expressing a threshold to extract the frame image data according to the detection of the face from the person registration data storage region 142 and determines the threshold using the data. The threshold is automatically calculated through the machine learning and is stored in the person registration data storage region 142.

Figure 5:
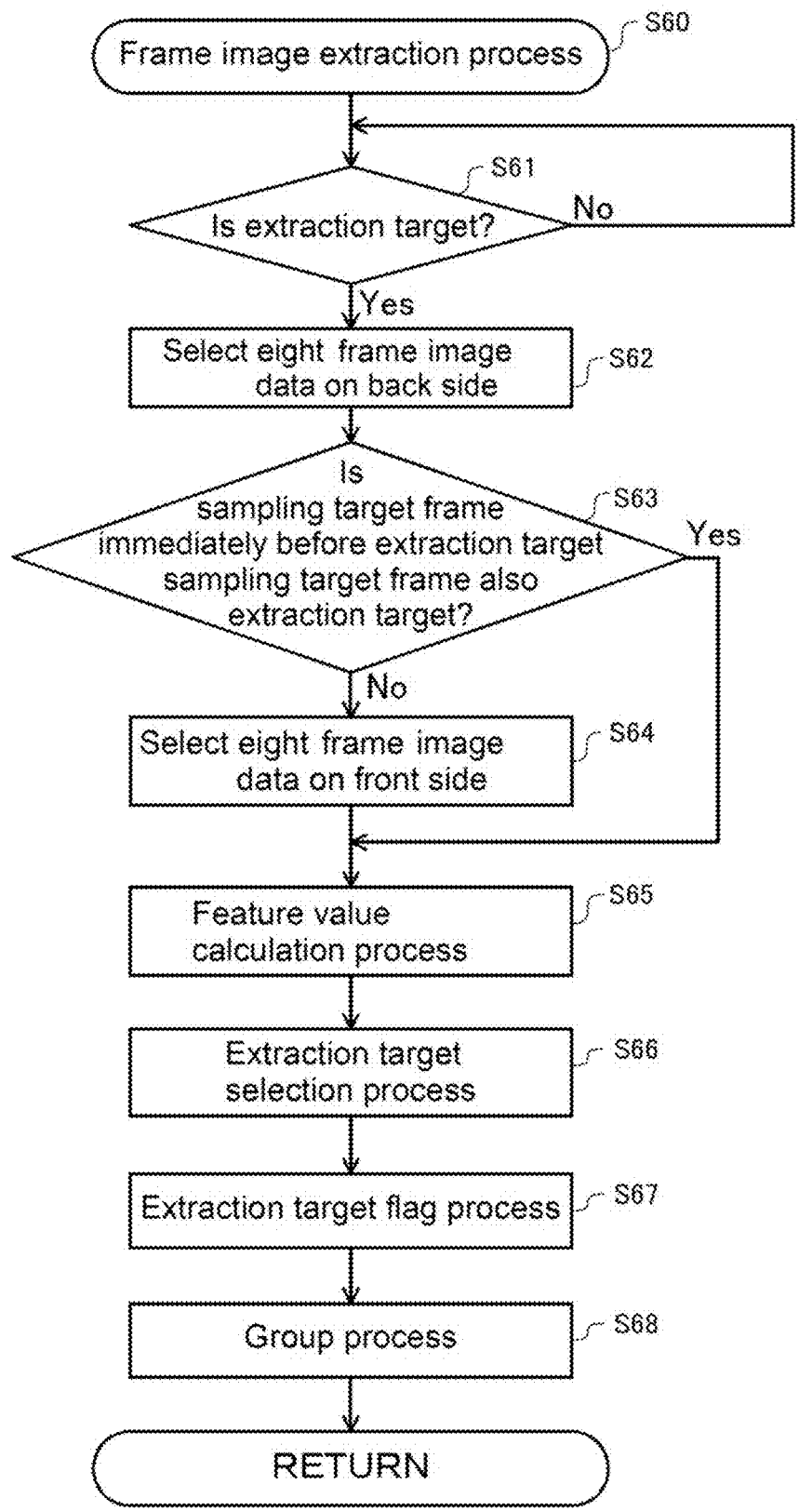
FIG. 5 illustrates contents of the frame image extraction process according to the first embodiment.

FIG. 5 illustrates (see FIG. 2) contents of the frame image extraction process (Step S60) according to the first embodiment. At Step S61, the frame image extraction unit 113 determines whether each sampling target frame is the extraction target or not. The frame image extraction unit 113 determines whether the sampling target frame is the extraction target or not based on whether the feature value of each sampling target frame is equal to or more than the threshold. The threshold is a value read from the person registration data storage region 142.

When the sampling target frame is the extraction target, the frame image extraction unit 113 advances the process to Step S62. In this example, the sampling target frames with the feature values equal to or more than the threshold are the three frame image data F18, F45, and F54 in the first frame image group FG1. The sampling target frame (sampling target still image data) as the extraction target is also referred to as first extraction target still image data.

At Step S62, the feature value operator 112 selects frame image data (also referred to as adjacent still image data) in a preset range (eight pieces on the back side in this example) from the sampling target frame with the feature value equal to or more than the threshold as frame image data candidate for extraction (see the second frame image group FG2). The sampling target frames F18, F45, and F54 with the feature values equal to or more than the threshold are referred to as extraction target sampling target frames.

Specifically, for example, regarding the sampling target frame F18, the feature value operator 112 selects the eight frame image data F19 to F26, which are on the back side of the sampling target frame F18. Furthermore, regarding the sampling target frame F45, the feature value operator 112 selects the eight frame image data F46 to F53, which are on the back side of the sampling target frame F45, and regarding the sampling target frame F54, the feature value operator 112 selects the eight frame image data F55 to F62, which are on the back side of the sampling target frame F54.

At Step S63, the feature value operator 112 determines whether a sampling target frame immediately before the extraction target sampling target frame is the extraction target sampling target frame or not. When the sampling target frame immediately before the extraction target sampling target frame is the extraction target sampling target frame, the feature value operator 112 advances the process to Step S65. When the sampling target frame immediately before the extraction target sampling target frame is not the extraction target sampling target frame, the feature value operator 112 advances the process to Step S64.

Specifically, regarding the sampling target frame F18, since the sampling target frame F9 immediately before the sampling target frame F18 is not the extraction target sampling target frame, the feature value operator 112 advances the process to Step S64. The same applies to the sampling target frame F45. Meanwhile, regarding the sampling target frame F54, since the sampling target frame F45 immediately before the sampling target frame F54 is the extraction target sampling target frame, the feature value operator 112 advances the process to Step S65.

At Step S64, the feature value operator 112 selects the frame image data (also referred to as adjacent still image data) in a preset range (eight pieces on the front side in this example) from the extraction target sampling target frame as the frame image data candidate for extraction. Specifically, regarding the sampling target frame F18, the eight frame image data F10 to F17 are selected as the frame image data candidate for extraction, and regarding the sampling target frame F45, the eight sampling target frames F37 to F44 are selected as the frame image data candidate for extraction.

Meanwhile, regarding the extraction target sampling target frame F54, the frame image data F46 to F53 on the front side are not selected. This is because the frame image data F46 to F53 have already been selected as the eight frame image data on the back side of the extraction target sampling target frame F45.

The preset range is settable between the sampling target still image data (for example, the sampling target frame F45) immediately before the first extraction target still image data (for example, the sampling target frame F54) and the sampling target still image data (for example, the sampling target frame F63) immediately after the first extraction target still image data.

Thus, the feature value operator 112 selects the frame image data F10 to F17, F19 to F26, F37 to F44, F46 to F53, and F55 to F62 as the frame image data candidate for extraction. That is, the feature value operator 112 can set the sampling target frames at predetermined frame intervals and calculate the feature values to calculate feature values (also referred to as second feature values) limiting to a part of the frame image data having a high possibility of being the extraction targets among many frame image data.

This method has been invented by the inventor of the present application based on the following knowledge. That is, it is rare that a distinctive part included in each frame image of a moving image only appears in a local frame (a frame image equivalent to an extremely short period). It is considered that, for example, in the calculation of the feature value with the face of the person as the feature, the face is not detected only from several frame images in the moving image and the face is captured in frames (for example, tens of frames) consecutive to some extent.

Considering such characteristics of the moving image, the inventor of this application has invented the method that detects a sequence of scenes in which a photographed subject as a target for the calculation of the feature value is captured in the sampling target frames and then calculates the feature value of only the frame image data (the frames near the sampling target frame) constituting the scene. Thus, the inventor of this application has achieved the method for solving a trade-off problem, calculation accuracy and a processing load of the feature value in the process of extracting the still image data from the moving image data.

At Step S65, the feature value operator 112 performs the feature value calculation process. In this example, contents of the feature value calculation process are identical to those of the feature value calculation process at Step S40. That is, while the second feature value is identical to the first feature value in this example, the feature values can be configured as feature values different from one another.

At Step S66, the frame image extraction unit 113 functions as a still image data extraction unit and performs an extraction target selection process. In the extraction target selection process, the frame image extraction unit 113 performs the process similar to the process at Step S61 and determines whether the feature value of each frame image data candidate for extraction is equal to or more than the threshold or not to select the frame image data candidate for extraction with the feature value equal to or more than the threshold.

In this example, the frame image extraction unit 113 selects the frame image data F12 to F17, F19 to F21, F40 to F44, F46 and F47, F50 to F53, and F55 to F61 as the second extraction target still image data as indicated in the third frame image group FG3. The second extraction target still image data constitutes extraction target frame image data together with the extraction target sampling target frames (also referred to as the first extraction target still image data).

At Step S67, the frame image extraction unit 113 performs an extraction target flag process. In the extraction target flag process, the frame image extraction unit 113 sets a flag indicative of being the extraction target to the extraction target frame image data.

At Step S68, the frame image extraction unit 113 performs a group process. In the group process, the frame image extraction unit 113 groups (see FIG. 3) a plurality of extraction target frame image data to which the flags are set centering on the extraction target sampling target frames.

Specifically, the frame image extraction unit 113 creates (see the third frame image group FG3) a group of a first frame image data group FE1 centering on the extraction target sampling target frame F18. The first frame image data group FE1 includes the ten extraction target frame image data F12 to F21 consecutive in time series.

Furthermore, the frame image extraction unit 113 creates groups of a second frame image data group FE2 and a third frame image data group FE3 centering on the extraction target sampling target frames F45 and F54, respectively. The second frame image data group FE2 includes the eight extraction target frame image data F40 to F47 consecutive in time series. The third frame image data group FE3 includes the 12 extraction target frame image data F50 to F61 consecutive in time series.

Since the frame image data F48 and F49 between the two frame image data F47 and F50 are not selected as the extraction target frame image data in this example, the frame image data F47 and F50 are respectively grouped into the second frame image data group FE2 and the third frame image data group FE3. However, assuming that the frame image data F48 and F49 are selected as the extraction target frame image data, the third frame image data group FE3 is grouped merged into the second frame image data group FE2.

The control unit 110 repeatedly performs the processes of Step S20 to Step S60 up to the final frame image data (Step S70).

At Step S80, the control unit 110 performs a frame image data output process. In the frame image data output process, the control unit 110 stores the first frame image data group FE1, the second frame image data group FE2, and the third frame image data group FE3 in the still image storage region 141 in the storage unit 140.

This manages the first frame image data group FE1, the second frame image data group FE2, and the third frame image data group FE3 as three consecutive image data files, thereby ensuring handling in units of groups. The still image storage region 141 stores (see FIG. 3) the extraction target frame image data in each of the first frame image data group FE1, the second frame image data group FE2, and the third frame image data group FE3 on which the DCT transform has been performed as JPEG still image data.

Thus, the image forming apparatus 100 according to the first embodiment can detect a sequence of scenes where the photographed subject as the target for the calculation of the feature value is captured in the sampling target frames and then calculate the feature value of only the frame image data constituting the scenes. This ensures solving the trade-off problem, the calculation accuracy and the processing load of the feature value in the process of extracting the still image data from the moving image data.

While the first embodiment creates the frame image data of all of frames and samples frame image data among the frame image data at the predetermined periods, the method is not limited to this. Specifically, for example, for detection of the sampling target frames, only the sampling target frames may be created from the moving image data.

Specifically, in the case of the sampling target frames being the I-frames, the frame image data can be created with only the I-frames. This is because the I-frames are frames that hold all information of the frames and are frames encoded without the use of the inter-frame prediction. In the case of the sampling target frames being the P-frames, the frame image data can be created using the related I-frames and P-frames by the inter-frame prediction. In the case of the sampling target frames being the B-frames, the frame image data can be created using the related I-frames, P-frames, and B-frames by the inter-frame prediction.

Furthermore, for example, only the I-frames may be sampled. Doing so eliminates the need for execution of the inter-frame prediction, thereby ensuring significantly reducing the processing load. Alternatively, only the I-frames and the P-frames may be sampled. This is because since the B-frames are not used for the inter-frame prediction of the P-frames, the frame image data can be created from only the I-frames and the P-frames.

The sampling of the I-frames or the I-frames and the P-frames can achieve the sampling period by, for example, sampling the frames matching the sampling period or the frames at the maximum intervals in the sampling period. When both of the I-frames and the P-frames are absent in the sampling period, the frame image data may be created using the B-frames based on the determination.

B. Second Embodiment

Figure 6:
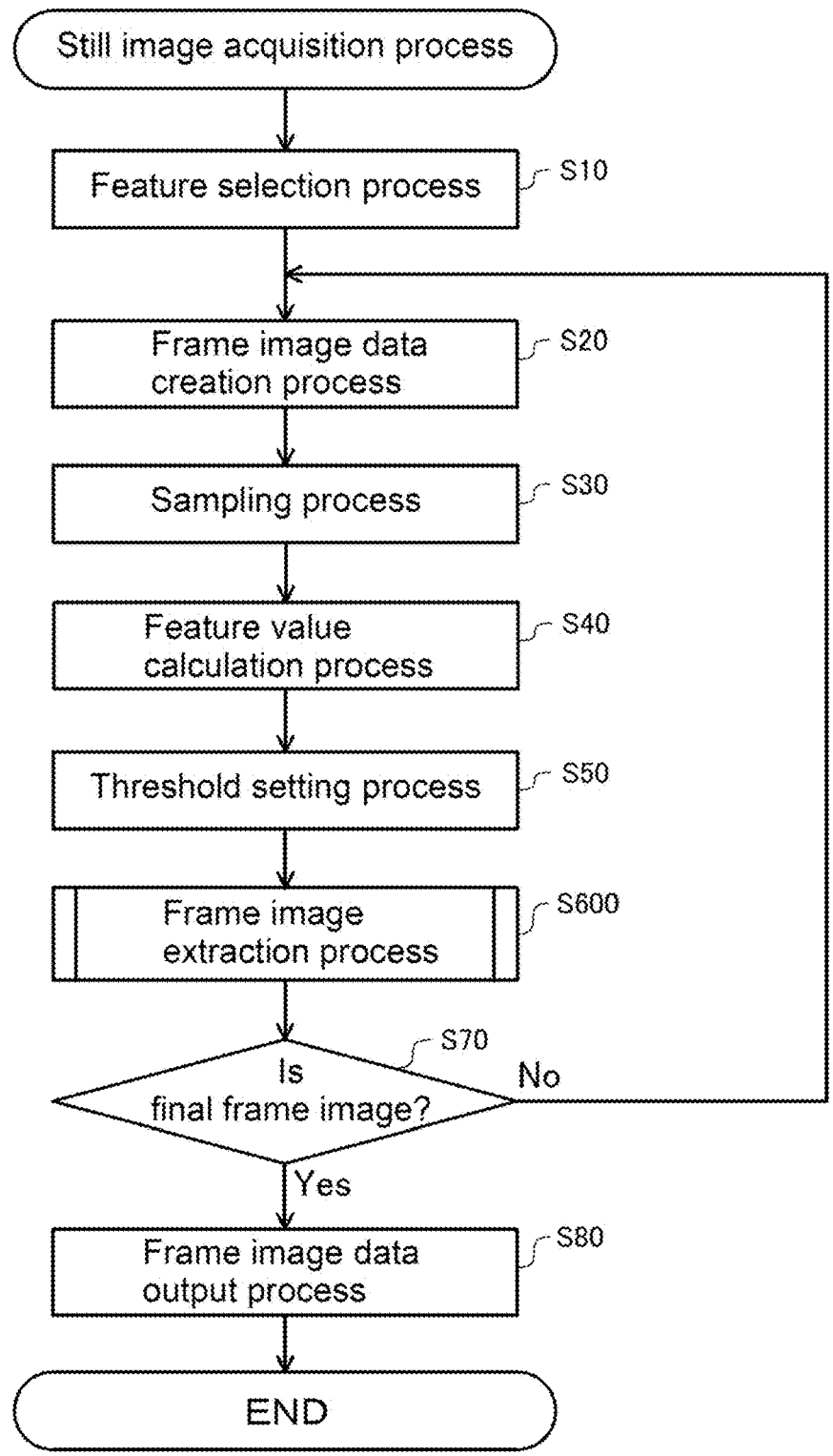
FIG. 6 illustrates contents of a still image acquisition process according to a second embodiment.
Figure 7:
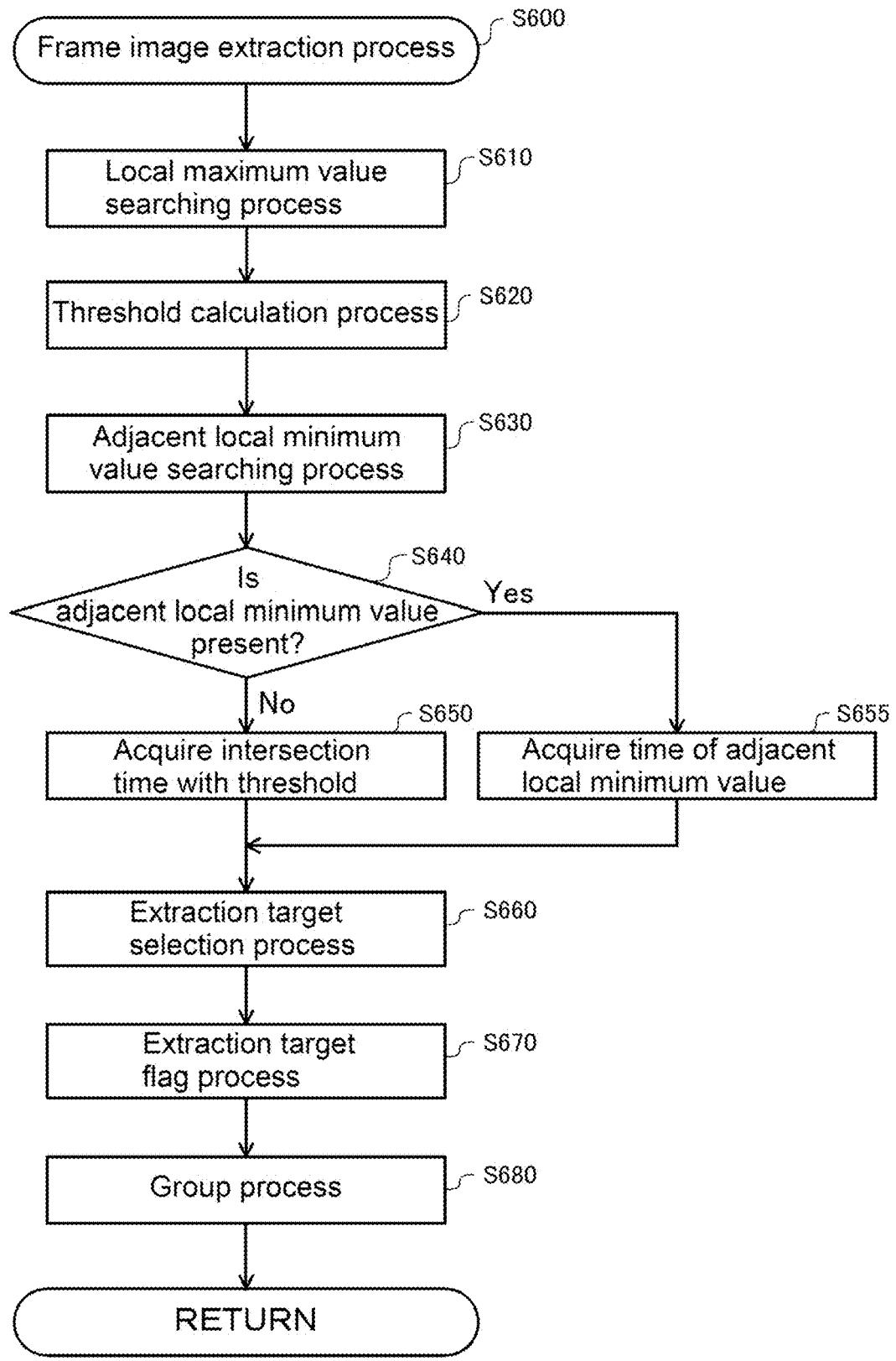
FIG. 7 illustrates contents of a frame image extraction process according to the second embodiment.

FIG. 6 illustrates contents of a still image acquisition process according to the second embodiment. FIG. 7 illustrates contents of a frame image extraction process according to the second embodiment. The still image acquisition process according to the second embodiment differs from the still image acquisition process according to the first embodiment in that the frame image extraction process (Step S60) is changed to a frame image extraction process (Step S600). The frame image extraction process (Step S600) features that the frame images near the local maximum value of the feature value in time series are extracted.

The feature value is set so as to quantitatively express that the image is a still image desired by the user. Accordingly, the local maximum value of the feature value is intended so as to express that the frame image is a frame image at the moment when an image is captured as intended when a photographer sets up the photographed subject. The image as intended in this example means an image in which a face of a specific person can be captured large in a front view or an image in which a face of a person with a high level of smile is captured. The level of smile can be calculated by, for example, a statistical identification method that uses a well-known 3D model fitting method and uses shapes of eyes and a mouth and further images of peripheries of the eyes and the mouth.

However, the image with the feature value of the local maximum does not always match the image desired by the user. Specifically, for example, seen from a user as a parent, an image in which a child takes an expression desired by the parent does not always have the level of smile with the local maximum value. The second embodiment extracts the frame images near the feature value with the local maximum value and narrows down the frame images by, for example, the level of smile such that the user can select a favorite frame image among the frame images.

At Step S610, the frame image extraction unit 113 performs a local maximum value searching process. In the local maximum value searching process, the frame image extraction unit 113 searches for the local maximum value of the feature value in time series. The local maximum value means the local (namely, near a certain point) maximum value of the feature value.

Figure 8:
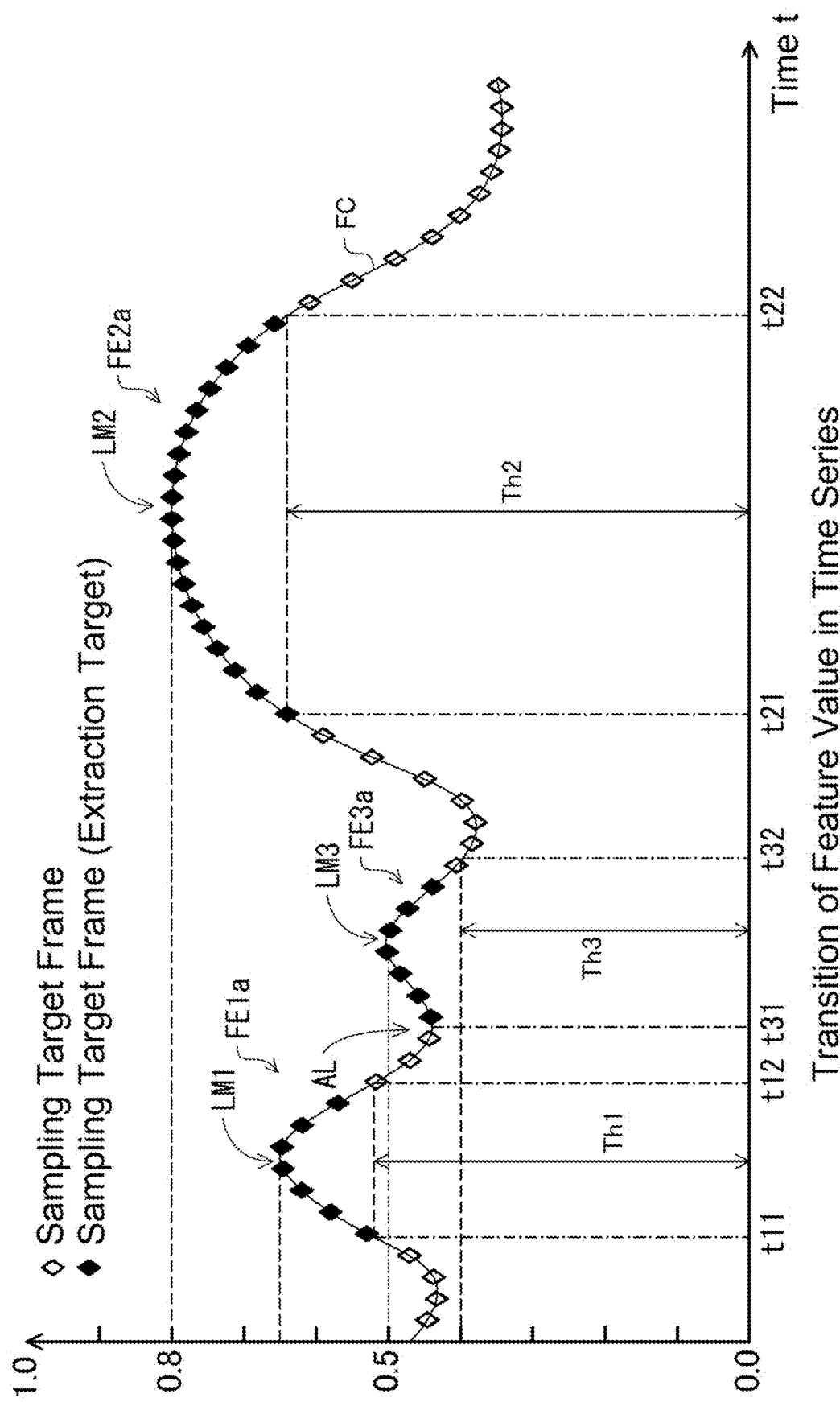
FIG. 8 illustrates an outline of the frame image extraction process according to the second embodiment.

FIG. 8 illustrates an outline of the frame image extraction process according to the second embodiment. FIG. 8 illustrates a feature value curved line FC expressing a variation of the feature value in time series. In this example, the feature value curved line FC has a first local maximum value LM1, a second local maximum value LM2, and a third local maximum value LM3. In FIG. 8, the feature value is normalized such that the minimum value becomes 0 and the maximum value becomes 1. The first local maximum value LM1 has the feature value of 0.65, the second local maximum value LM2 has the feature value of 0.8, and the third local maximum value LM3 has the feature value of 0.5.

In this example, the feature value curved line FC is constituted as a spline curve created using the feature values of the sampling target frames. The spline curve includes curved lines passing through the feature values of the sampling target frames and spline curves (for example, B-spline curves) not always passing through the feature values of the sampling target frames. The feature value curved line FC is not limited to the spline curve, and the feature value curved line FC only needs to be an approximated curve passing through the feature values of the sampling target frames or near the feature values.

At Step S620, the frame image extraction unit 113 performs a threshold calculation process. In the threshold calculation process in this example, the frame image extraction unit 113 calculates a threshold as 80%, which is a preset predetermined proportion, with respect to the local maximum value. Specifically, for example, a threshold Th1 with respect to the first local maximum value LM1 (feature value: 0.65) becomes 0.52, a threshold Th2 with respect to the second local maximum value LM2 (feature value: 0.8) becomes 0.64, and a threshold Th3 with respect to the third local maximum value LM3 (feature value: 0.5) becomes 0.4.

At Step S630, the frame image extraction unit 113 performs an adjacent local minimum value searching process. In the adjacent local minimum value searching process, the frame image extraction unit 113 searches for a local minimum value exceeding the threshold in the proximity of each local maximum value. Specifically, the frame image extraction unit 113 can find a local minimum value AL exceeding the threshold Th3 (0.4) near the third local maximum value LM3.

At Step S640, with the adjacent local minimum value present, the frame image extraction unit 113 advances the process to Step S655, and with the adjacent local minimum value absent, the frame image extraction unit 113 advances the process to Step S650. In this example, the frame image extraction unit 113 advances the process to Step S650 regarding the first local maximum value LM1 and the second local maximum value LM2. Meanwhile, the frame image extraction unit 113 advances the process to Step S655 for an initial time of the third local maximum value LM3 and advances the process to Step S650 for a termination time of the third local maximum value LM3.

At Step S650, the frame image extraction unit 113 acquires an intersection time with the threshold. The intersection time with the threshold can be obtained using the spline curve or can be obtained as a time of the frame image data having the feature value larger than the threshold and closest to the threshold. In this example, the frame image extraction unit 113 acquires an initial time t11 and a termination time t12 for the first local maximum value LM1, acquires an initial time t21 and a termination time t22 for the second local maximum value LM2, and acquires a termination time t32 for the third local maximum value LM3.

At Step S655, the frame image extraction unit 113 acquires the time of the adjacent local minimum value. The time of the adjacent local minimum value can be obtained using the spline curve or can be obtained as the time of the frame image data near the adjacent local minimum value. In this example, the frame image extraction unit 113 acquires an initial time t31 as the time of an adjacent local minimum value AL for the third local maximum value LM3.

At Step S660, the frame image extraction unit 113 functions as the still image data extraction unit to perform the extraction target selection process. In the extraction target selection process, the frame image extraction unit 113 selects the frame image data in a predetermined time range between the initial time and the termination time in the proximity of each local maximum value as the extraction target frame image data. In other words, the predetermined time range is set using a time between each local maximum value and the initial time (or the time of the adjacent local minimum value) and a time between each local maximum value and the termination time (or the time of the adjacent local minimum value).

In this example, the frame image extraction unit 113 selects the frame image data between the initial time t11 and the termination time t12 for the first local maximum value LM1, selects the frame image data between the initial time t21 and the termination time t22 for the second local maximum value LM2, and selects the frame image data between the initial time t31 and the termination time t32 for the third local maximum value LM3.

At Step S670, the frame image extraction unit 113 performs the extraction target flag process. In the extraction target flag process, the frame image extraction unit 113 sets a flag indicative of being the extraction target to the extraction target frame image data.

At Step S680, the frame image extraction unit 113 performs the group process. In the group process, the frame image extraction unit 113 groups the plurality of extraction target frame image data to which the flags are set for each of the local maximum values (see FIG. 8). Accordingly, the frame image extraction unit 113 can create each of frame image data groups FE1a, FE2a, and FE3a as a consecutive image data file for the first local maximum value LM1, the second local maximum value LM2, and the third local maximum value LM3.

Thus, the frame image extraction process according to the second embodiment searches for the local maximum value of the feature value and extracts the frame image data near the local maximum value of the feature value using the intersection time (or the time of the adjacent local minimum value) with the threshold 80% of the local maximum value. Accordingly, with a steep peak shape (or a gradient) of the local maximum value, the image forming apparatus 100 reduces a frame count to be extracted to ensure an efficient extraction. Meanwhile, with a gentle peak shape (or the gradient) of the local maximum value, the image forming apparatus 100 determines that the images can be stably acquired over a long time as intended, thus ensuring increasing the frame count to be extracted.

While this embodiment uses the intersection time with the threshold 80% of the local maximum value, the value is not limited to 80%, and the setting method of the time to determine the proximity of the local maximum value of the feature value is not limited to the method of using the threshold and the intersection time. With the steep peak shape of the local maximum value, the frame image extraction process according to the second embodiment only needs to be configured to reduce the frame count to be extracted. Meanwhile, with the gentle peak shape of the local maximum value, the frame image extraction process only needs to be configured to increase the frame count to be extracted.

While in this embodiment, the feature value curved line FC is constituted as the approximated curve created using the feature values of the sampling target frames, the feature values of the sampling target frames are not necessarily to be used but all frame image data may be used.

C. Third Embodiment

Figure 9:
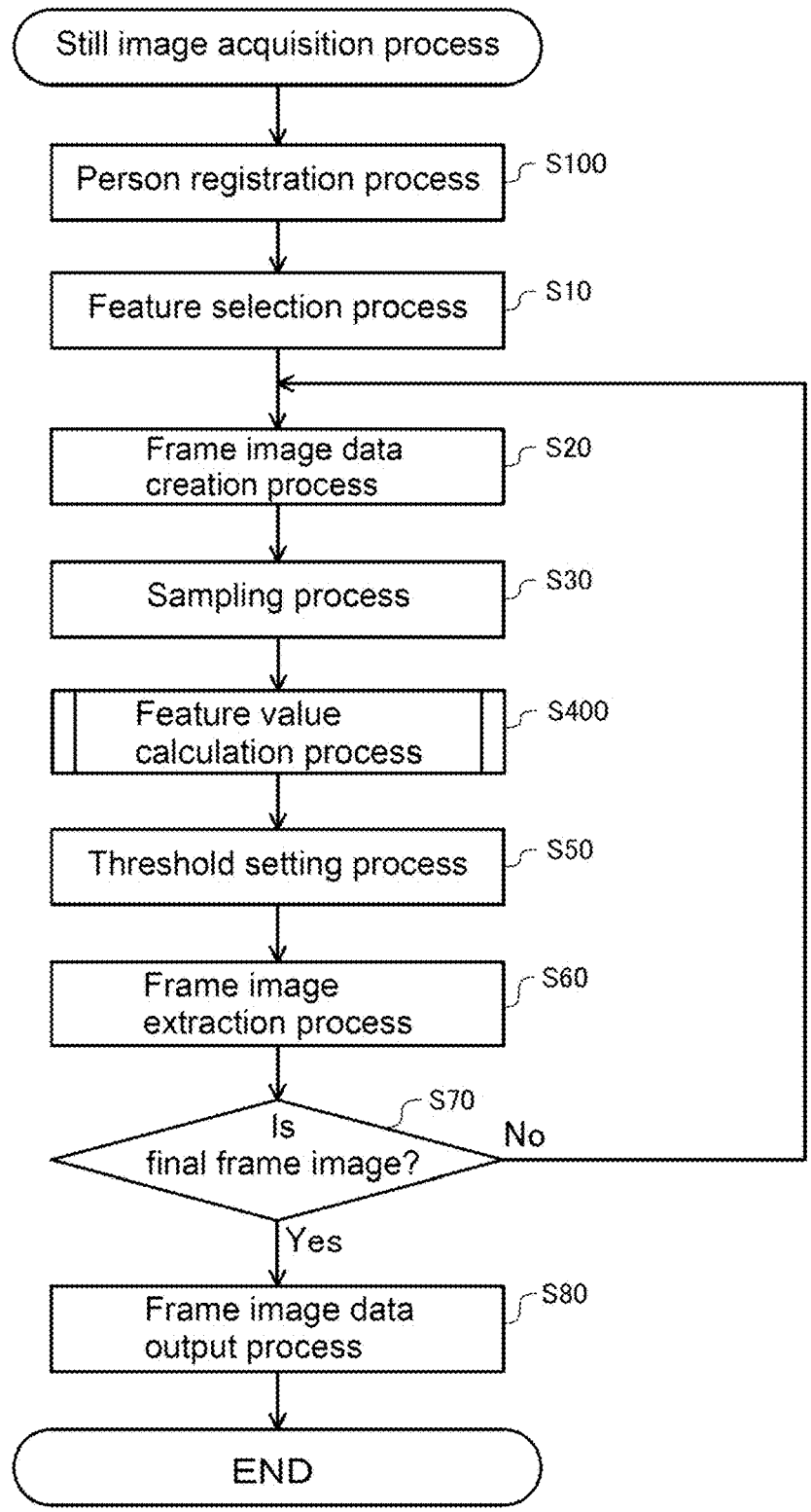
FIG. 9 illustrates contents of a still image acquisition process according to a third embodiment.

FIG. 9 illustrates contents of the still image acquisition process according to the third embodiment. The still image acquisition process according to the third embodiment differs from the still image acquisition processes according to the first embodiment and the second embodiment in that a person registration process (Step S100) is added and the feature value calculation process (Step S40) is changed to a feature value calculation process (Step S400).

Figure 10:
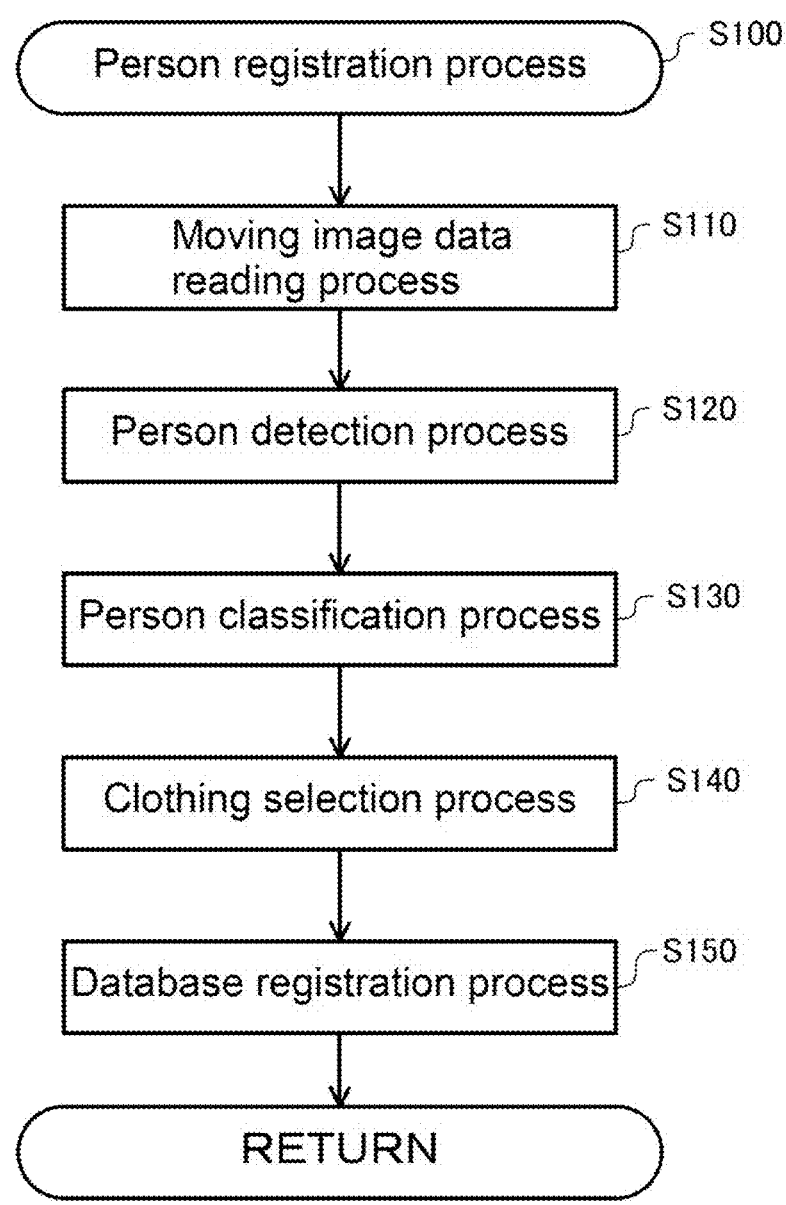
FIG. 10 illustrates contents of a person registration process according to the third embodiment.

FIG. 10 illustrates contents of the person registration process according to the third embodiment. At Step S110, the user performs a moving image data reading process for the person registration process. In the moving image data reading process, the user selects moving image data for the person registration process using the operation display 130 to instruct reading of the moving image data. The moving image data can be configured such that the image forming apparatus 100 can read the moving image data using, for example, wireless communications (not illustrated) and a transportable storage medium (not illustrated).

At Step S120, the feature value operator 112 in the control unit 110 performs a person detection process. In the person detection process, the feature value operator 112 creates the frame image data from the moving image data and extracts a person detection region as an image region having features thought to be the person from the still images expressed by frame image data files. The feature value operator 112, for example, can extract the person detection region using machine learning such as support vector machine (SVM) based on a histograms of oriented gradients (HOG) feature value.

At Step S130, the feature value operator 112 performs a person classification process. In the person classification process, the feature value operator 112, for example, classifies a person in the person detection region into someone of a preliminary registered family. This embodiment assumes that the user has preliminary registered a father A, a mother B, a son C, and a daughter D as a family using the operation display 130.

The feature value operator 112 selects frame image data displaying a face of a person with a size larger than the preset image region, automatically classifies the frame image data into a plurality of groups, and displays the frame image data on the operation display 130. The user selects and inputs that each of the plurality of groups corresponds to which of the father A, the mother B, the son C, the daughter D, or another person via the operation display 130.

Furthermore, the user can perform a correction operation according to an incorrect recognition, for example, the group of the son C includes the still image of the father A. Accordingly, the feature value operator 112 can improve accuracy of the machine learning. The feature value operator 112 creates a database using the father A, the mother B, the son C, and the daughter D as records. HOG feature values of face images of the father A, the mother B, the son C, and the daughter D are registered in the database.

At Step S140, the feature value operator 112 performs a clothing selection process. In the clothing selection process, the feature value operator 112 extracts HOG feature values regarding clothing that each of the father A, the mother B, the son C, and the daughter D wears from the frame image data. Accordingly, the feature value operator 112 can identify the person using the HOG feature values of the clothing images, in addition to the HOG feature values of the face images of the father A, the mother B, the son C, and the daughter D. Because there is a tendency that each person often wears identical clothing and a different person wears different clothing.

At Step S150, the feature value operator 112 performs a database registration process. In the database registration process, the feature value operator 112 stores the database regarding the father A, the mother B, the son C, and the daughter D in the person registration data storage region 142 in the storage unit 140. The database includes any attribute data that can be input by the user including a height, in addition to the HOG feature values of the face images and the HOG feature values of the clothing images, machine learning data of the face images, and machine learning data of the clothing images of the father A, the mother B, the son C, and the daughter D as the records.

The user can further register the data of the face images and the clothing images of each person using the still image data imaged by a digital camera. The feature value operator 112 can use such image data, create the HOG feature values of the face images and the HOG feature values of the clothing images, and register them in the database. This embodiment assumes that the HOG feature values are created based on the YUV image data where a calculation load in image recognition is small.

Figure 11:
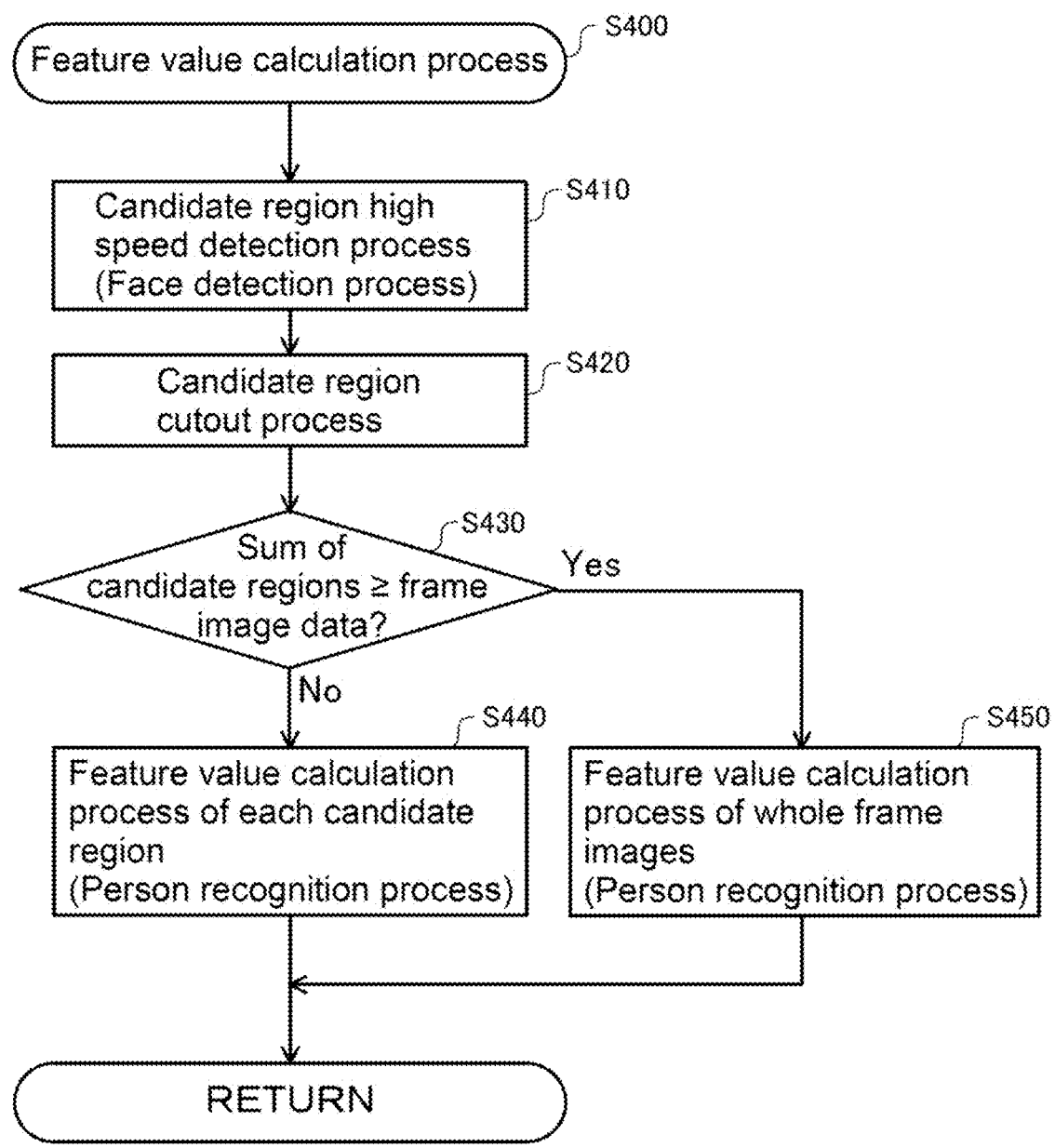
FIG. 11 illustrates contents of a feature value calculation process according to the third embodiment.

FIG. 11 illustrates contents of the feature value calculation process according to the third embodiment. In the feature value calculation process (Step S400), the feature value operator 112 performs a candidate region high speed detection process of a comparatively small processing load, detects candidate regions, which are regions having a predetermined feature, and calculates (comparatively large processing load) a feature value to identify a person in each detected candidate region.

At Step S410, the feature value operator 112 performs the candidate region high speed detection process. In the candidate region high speed detection process, the feature value operator 112 detects the candidate regions from the frame image data. The candidate region high speed detection process employs a detection process method constituted prioritizing a process speed over a person recognition process (described later).

Specifically, the feature value operator 112 performs a widely used face detection process, for example, a multistage filter process using a Haar-like detector. Note that the multistage filter process is constituted so as to prioritize a calculation speed by reducing a count of stages. Accordingly, the candidate region high speed detection process is permitted to detect regions undesired by the user as the candidate regions.

At Step S420, the feature value operator 112 performs a candidate region cutout process. In the candidate region cutout process, the feature value operator 112 obtains candidate region information, which is information expressing coordinates and a size to express a position of each candidate region detected in the frame image data as bitmap image data and creates bitmap image data of each candidate region using the candidate region information.

At Step S430, the feature value operator 112 compares a sum of the counts of pixels (areas) of the bitmap image data of the plurality of candidate regions with total pixels (entire area) of the frame image data. The inventor of this disclosure has found a problem that the plurality of candidate regions overlap with one another, the sum of counts of pixels of the plurality of candidate regions exceeds the count of pixels of the frame image data, and this causes a possibility that an amount of calculation increases on the contrary.

With the sum of the counts of pixels of the plurality of candidate regions being less than the count of pixels of the frame image data, the feature value operator 112 advances the process to Step S440. With the sum of the counts of pixels of the plurality of candidate regions equal to or more than the count of pixels of the frame image data, the feature value operator 112 advances the process to Step S450. This ensures solving the above-described problem of the increase in the amount of calculation by the feature value operator 112.

At Step S440, the feature value operator 112 calculates each feature value based on the bitmap image data of each candidate region and outputs the maximum value as the feature value. The reason that the maximum value is output is that the image of the identical person should be one in each bitmap image data. At Step S450, the feature value operator 112 calculates and outputs the feature value based on the bitmap image data as the whole frame image data.

Specifically, the feature value operator 112 performs the person recognition process. The person recognition process is a process that quantitatively expresses a possibility (degree of reliability) of being the specific person as the feature value. The person recognition process determines whether the feature (it is assumed in this example that the daughter D is selected in the feature selection process (Step S10)) selected at Step S10 is included in each of the plurality of frame image data stored in the frame memory 114 or not. The feature value operator 112 attempts to detect the daughter D from the frame image data as the YUV image data, which includes the luminance data and the color difference data.

The feature value operator 112 can detect and identify a person using, for example, the well-known Open Source Computer Vision Library (OpenCV). The feature value operator 112 detects the person among the frame image data and determines whether the face of the detected person is the face of the daughter D or not. This determination is made using the HOG feature value of the face image of the daughter D.

When the degree of reliability of the determination of whether the face is the face of the daughter D or not is low, the feature value operator 112 determines whether the person is the daughter D or not using the HOG feature value of the clothing image of the daughter D. The HOG feature value of the clothing image is supplementarily usable, for example, especially when the daughter D is captured from the lateral direction and therefore the size of the face image is small. The feature value operator 112 can further quantify the level of smile of the daughter D for use of the calculation of the feature value. Thus, the feature value operator 112 can perform a complicated process with a large amount of operation on each candidate region.

Thus, the frame image extraction process according to the third embodiment performs the candidate region high speed detection process, detects the candidate regions as the regions having the predetermined feature, and performs the calculation of the feature value whose calculation load is large in each of the detected candidate regions. Accordingly, since the third embodiment can reduce the target for calculation of the feature value, a highly accurate calculation method where the processing load is comparatively large can be employed avoiding excessive calculation load of the feature value as a whole.

While in this embodiment, the candidate region high speed detection process (Step S410) and the person recognition process (Steps S440 and S450) are processes of kinds different from one another, these processes may be processes of the identical kind and differ only in accuracy.

This embodiment can be mounted in combination with at least one of the first embodiment and the second embodiment or can be mounted without the combination with the first embodiment or the second embodiment. Furthermore, the frame image extraction processes according to the first embodiment to the third embodiment may be performed by the smart phone 200 functioning as the image processing apparatus, not the image forming apparatus 100.

D. Fourth Embodiment

Figure 12:
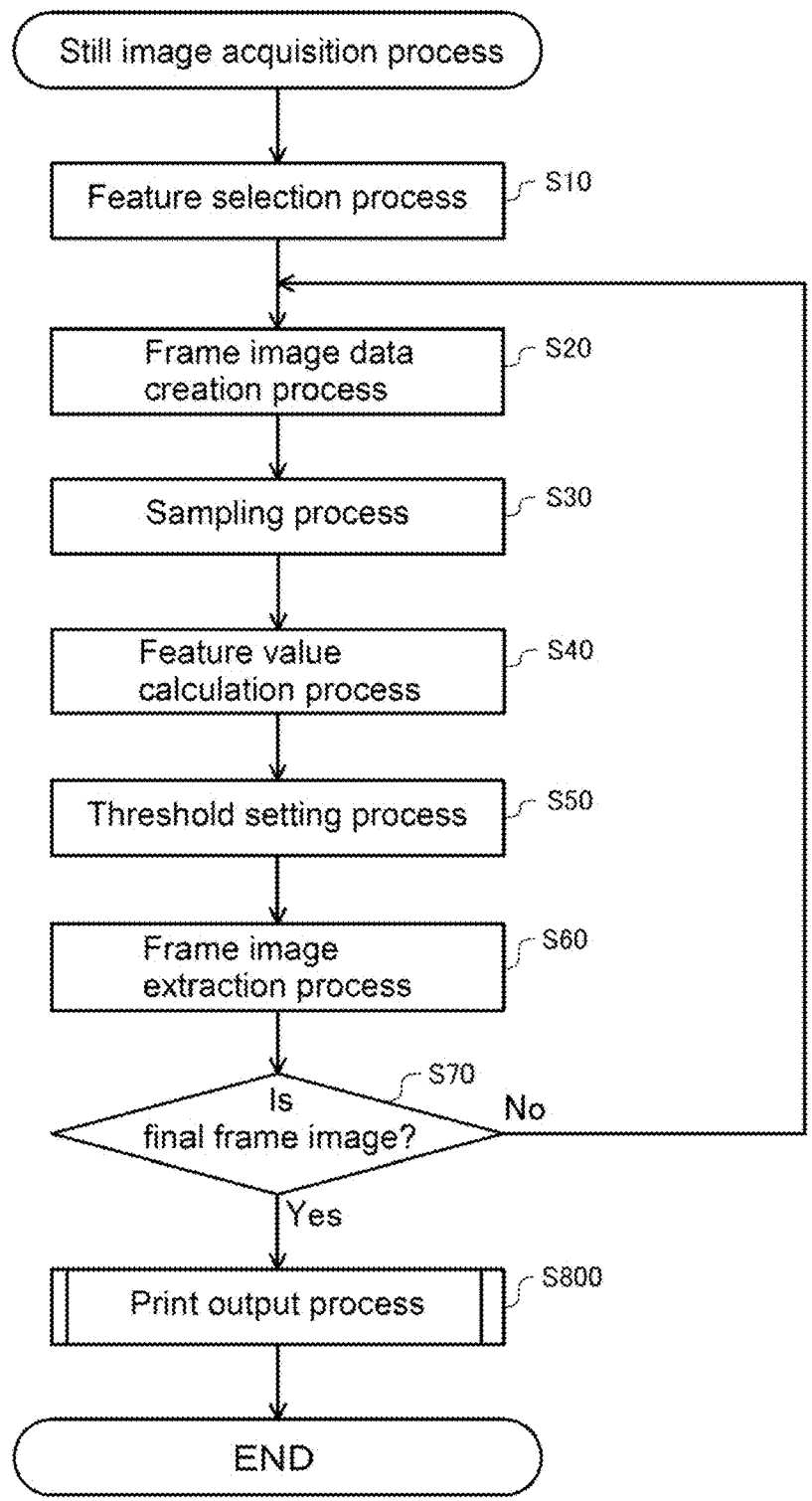
FIG. 12 illustrates contents of a still image acquisition process according to a fourth embodiment.

FIG. 12 illustrates contents of the still image acquisition process according to the fourth embodiment. The still image acquisition process according to the fourth embodiment differs from the still image acquisition processes according to the first embodiment to the third embodiment in that at least the frame image data output process (Step S80) is changed to a print output process (Step S800).

Figure 13:
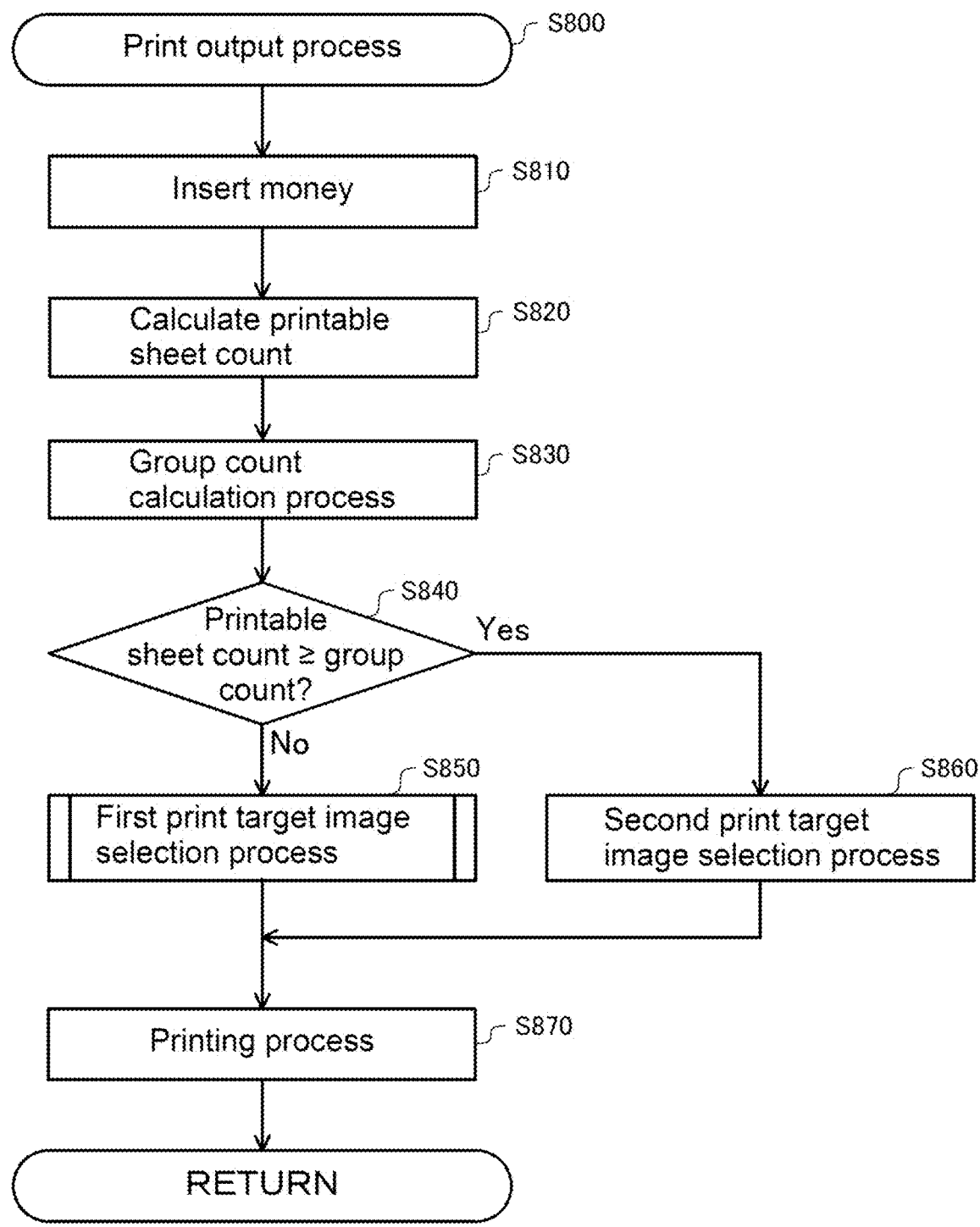
FIG. 13 illustrates contents of a print output process according to the fourth embodiment.

FIG. 13 illustrates contents of the print output process according to the fourth embodiment. In this example, the image forming apparatus 100 is installed in a convenience store or a similar location and can perform a print output according to any payment process including an insertion of money.

At Step S810, the user inserts the money from a slit for money insertion (not illustrated) of the image forming apparatus 100. It is assumed in this example that the user inserts a 500 yen coin into the image forming apparatus 100. It is assumed that the print size usable by the image forming apparatus 100 includes an L-size print (127 mm×89 mm) and a 2L-size print (127 mm×178 mm). In this example, the L-size print (127 mm×89 mm) is set as the initial setting of the print size and the unit price is 30 yen.

At Step S820, the control unit 110 functions as a printable sheet count calculation unit and calculates a printable sheet count. Until the print size is set, the control unit 110 calculates 16 sheets (=500 yen (the amount of money paid in the payment process)/30 yen (unit price)) as the printable sheet count based on the initial setting (L-size print).

At Step S830, the control unit 110 performs a group count calculation process. The group is a plurality of frame image data (constituting the consecutive image data file) consecutive in time series grouped by the group process (Step S68 and Step S680). Examples of the group include the first frame image data group FE1, the second frame image data group FE2, and the third frame image data group FE3 (first embodiment) and the three frame image data groups FE1a, FE2a, and FE3a (second embodiment).

At Step S840, the control unit 110 determines whether the printable sheet count is equal to or more than the group count or not. With the printable sheet count less than the group count, the control unit 110 advances the process to Step S850. With the printable sheet count equal to or more than the group count, the control unit 110 advances the process to Step S860. At Step S850, the control unit 110 performs a first print target image selection process. A second print target image selection process will be described later.

Figure 14:
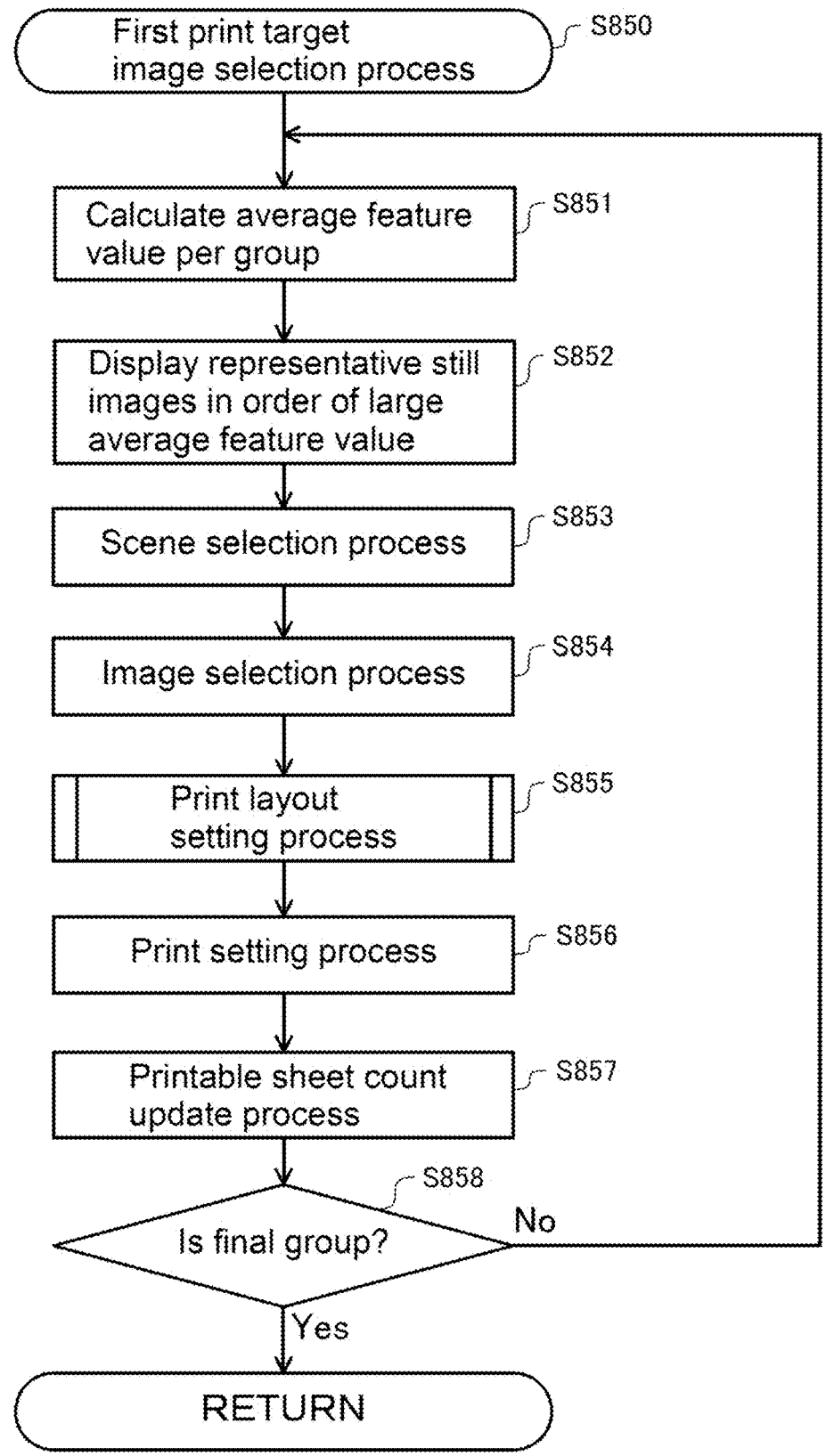
FIG. 14 illustrates contents of a print target image selection process according to the fourth embodiment.

FIG. 14 illustrates contents of the print target image selection process according to the fourth embodiment. At Step S851, the feature value operator 112 calculates an average feature value per group. The average feature value can be calculated as, for example, an average value of the feature values of upper ten frame image data in each group.

Figure 15A:
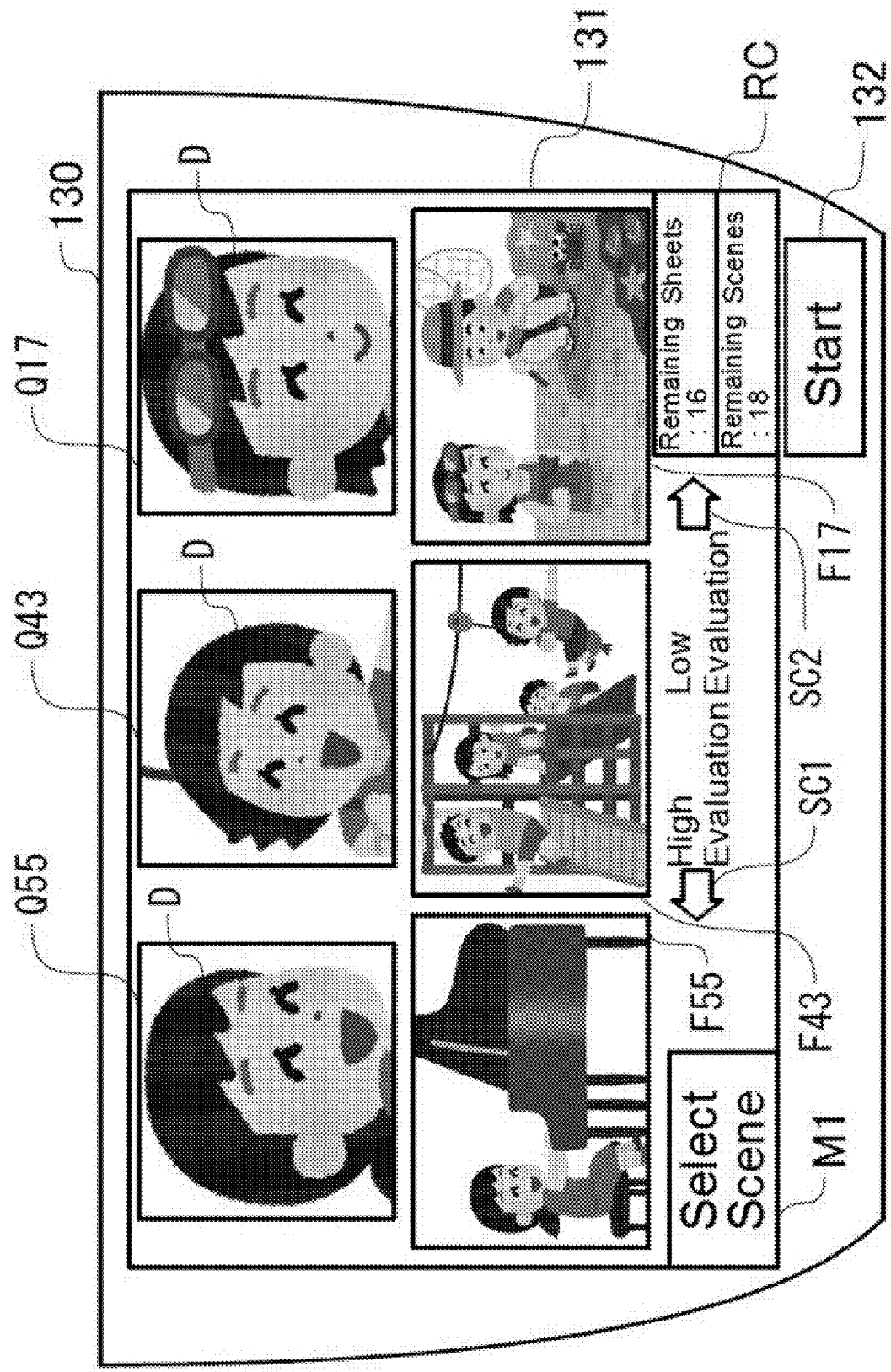
FIGS. 15A and 15B illustrate an operation display screen in the print target image selection process according to the fourth embodiment.
Figure 15B:
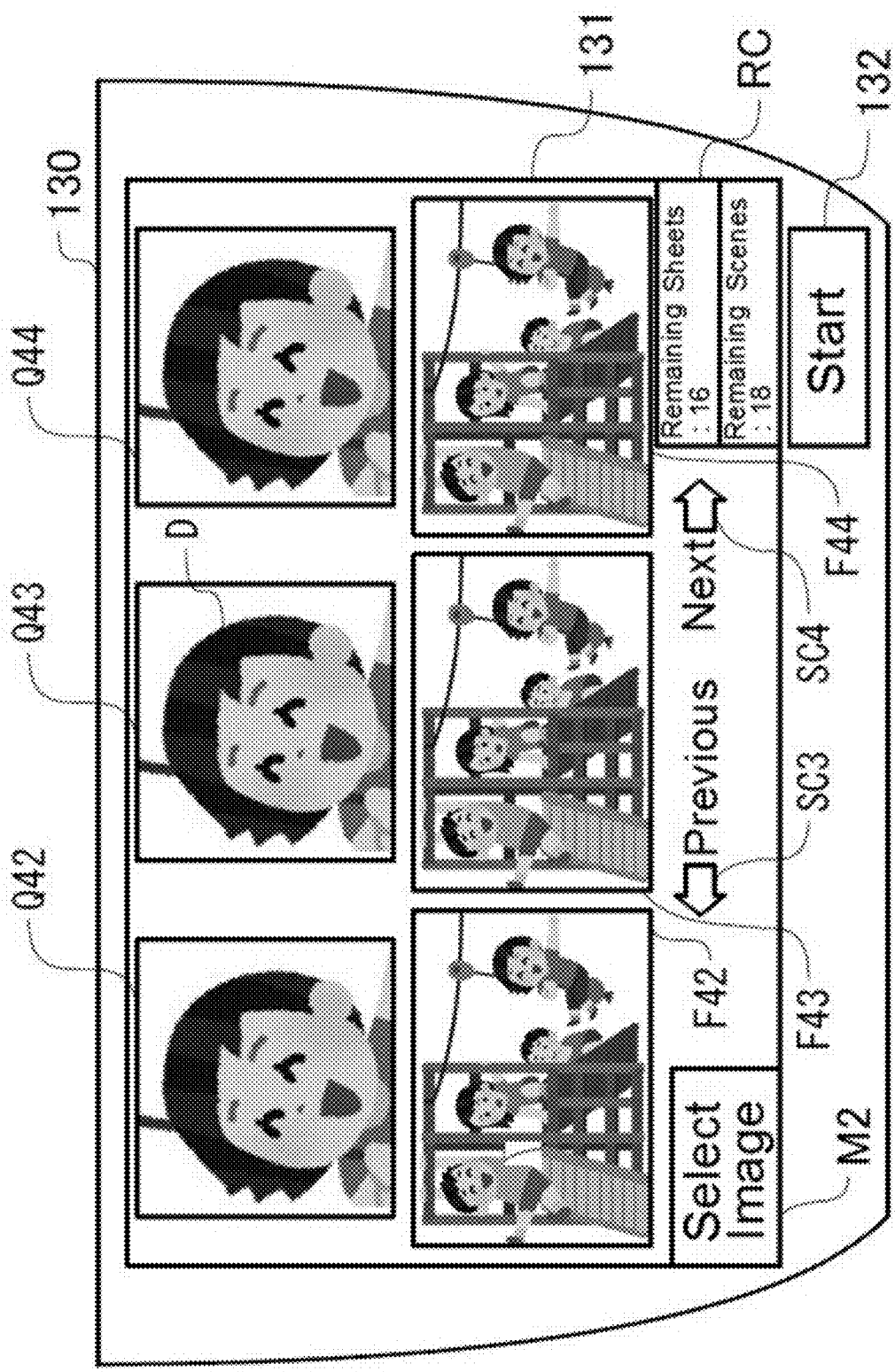

FIGS. 15A and 15B illustrate an operation display screen in the print target image selection process according to the fourth embodiment. In FIG. 15A, representative still images as a scene selection screen are displayed for each of the groups. It is assumed in this example that the plurality of frame image data included in each group constitute each of the scenes. On the operation display screens of FIGS. 15A and 15B, performing operations (such as a pinch-in, a pinch-out, and a drag) on the operation display 130 functioning as the touch panel ensures performing operations such as enlargement/reduction and movement of the displayed images.

In FIG. 15A, the display 131 in the operation display 130 displays three representative still images F55, F43, and F17, a scroll icon SC1 for a scroll in a high evaluation direction, a scroll icon SC2 for a scroll in a low evaluation direction, and a display region RC, which displays a count of remaining sheets (printable sheet count) and a count of remaining scenes. The display 131 functions as a touch panel, and swiping the display 131 ensures scrolling the screen.

At Step S852, the display 131 displays the representative still images in the order of large average feature value. The display 131 performs the display based on display data created by the control unit 110 functioning as a display control unit. The display data is data to associate distinctive regions with the representative still images and display the representative still images. The display data is constituted to display the distinctive regions of each of the plurality of representative still images such that the relationship with each of the plurality of representative still images is clear. The order to display the representative still images is not limited to the average feature values but only needs to be the order determined using the feature values.

In this example, the display 131 displays the three representative still images F55, F43, and F17 in the order of the large average feature value from the left side. The representative still image F55 is the still image expressed by the frame image data F55 representing the third frame image data group FE3. The representative still image F43 is the still image expressed by the frame image data F43 representing the second frame image data group FE2. The representative still image F17 is the still image expressed by the frame image data F17 representing the first frame image data group FE1 (see FIG. 4 of the first embodiment).

In this example, the display 131 displays feature images Q55, Q43, and Q17 as images of the distinctive regions on the upper side of the representative still images F55, F43, and F17. Accordingly, the user can confirm a criterion (or a reason) by which the groups including the representative still images F55, F43, and F17 are automatically selected. It is assumed in this example that each group of the representative still images F55, F43, and F17 is extracted based on the feature value to extract the still images that include the daughter D having the high level of smile as the photographed subject.

Specifically, the feature image Q55 is an image of the candidate region used to calculate the feature value when the representative still image F55 is extracted in the frame image extraction process according to the third embodiment. The feature image Q43 is an image of the candidate region used to calculate the feature value when the representative still image F43 is extracted. The feature image Q17 is an image of the candidate region used to calculate the feature value when the representative still image F17 is extracted.

At Step S853, the user selects a group as a selection process of the scene. It is assumed in this example that the user touches the representative still image F43 (or the feature image Q43) displayed on the display 131 to select the scene and fixes the scene by touching a scene selection icon M1.

FIG. 15B displays the two still images F42 and F44, which are before and after the representative still image F43 in an image selection screen. In FIG. 15B, the display 131 displays three still images F42, F43, F44, feature images Q42, Q43, and Q44, a display region RC that displays the count of remaining sheets and the count of remaining scenes, the scroll icon SC3 for a scroll to the front side in time series, and a scroll icon SC4 for a scroll to the back side.

This ensures solving a trade-off problem as follows. That is, to select a desired still image among many still images after extracting the still image data from the moving image data, there is a demand for a list display by decreasing the size of each still image. Meanwhile, decreasing the size of each still image decreases the distinctive image region (for example, the face image) of each still image, causing a trade-off problem of making the selection of the still image difficult.

At Step S854, the user selects the frame image data as an image selection process. It is assumed in this example that the user touches the still image F42 (or the feature image Q42) displayed on the display 131 to select the still image and fixes the still image by touching an image selection icon M2.

At Step S855, the user performs the print layout setting process. In the print layout setting process, the user extracts a part of the still image F42 and sets a print layout of the print size of L-size print or 2L-size print.

Figure 16:
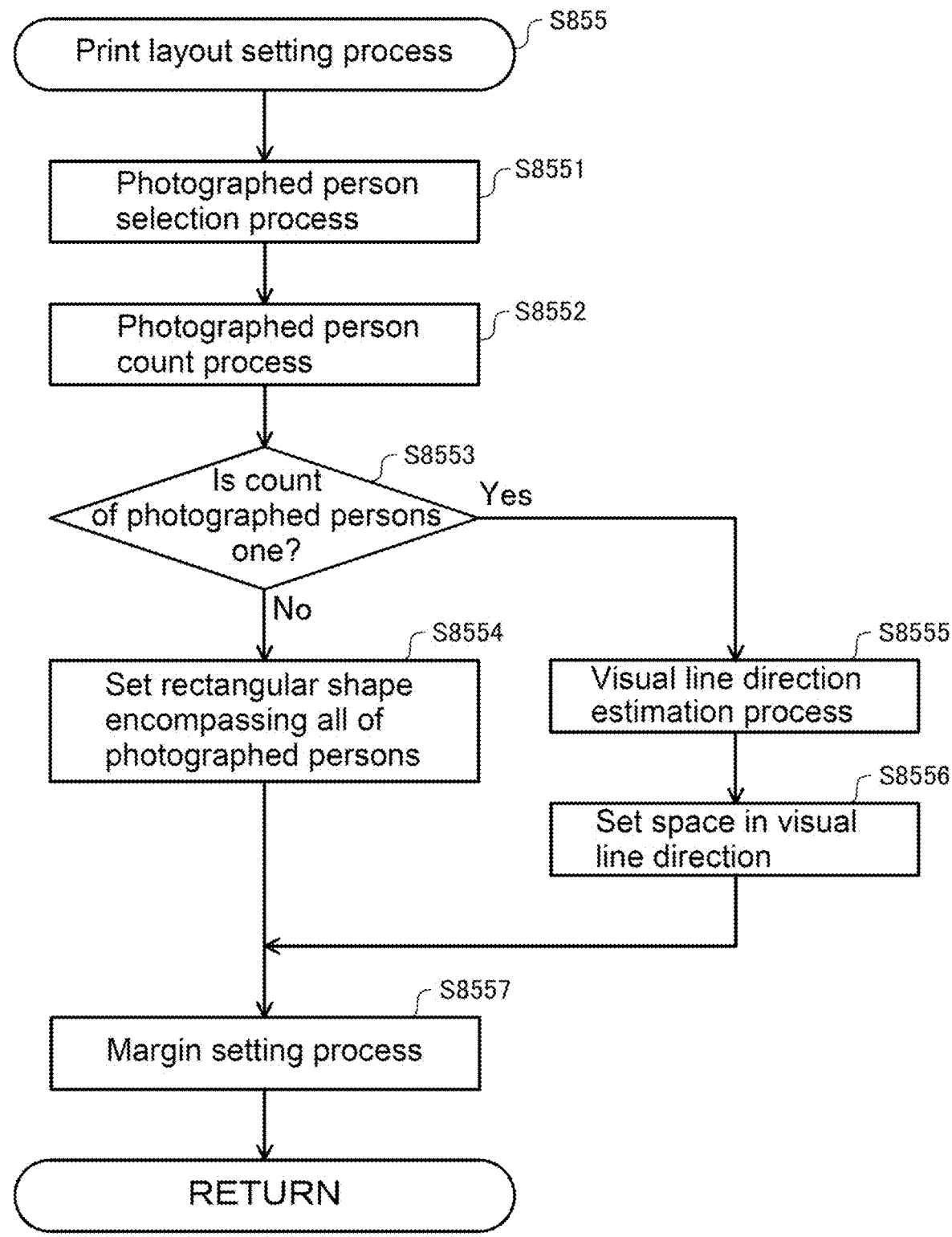
FIG. 16 illustrates contents of a print layout setting process according to the fourth embodiment.
Figure 17B:
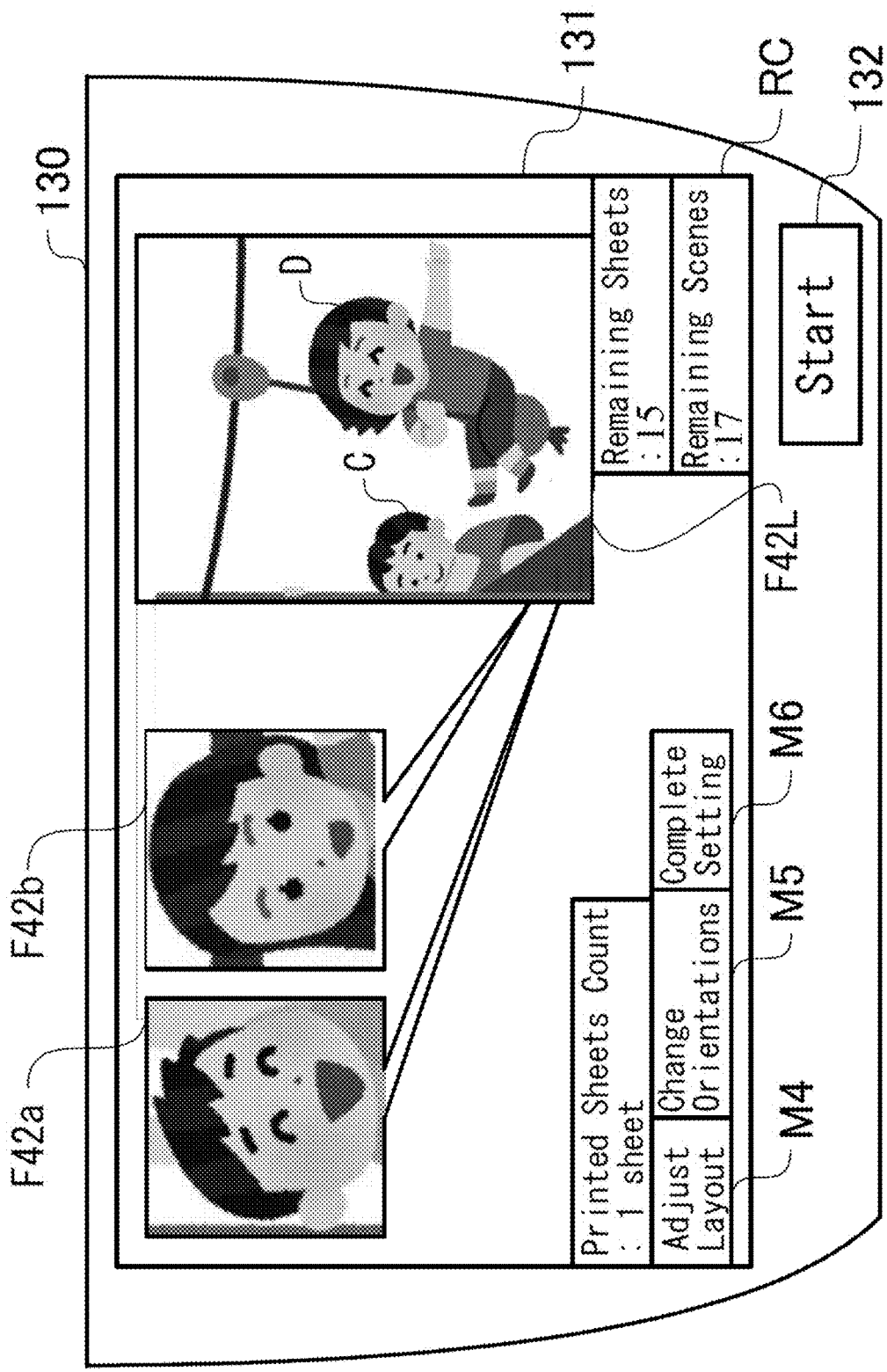

FIG. 16 illustrates contents of the print layout setting process according to the fourth embodiment. FIGS. 17A and 17B illustrate an operation display screen in the print layout setting process according to the fourth embodiment. FIG. 17A illustrates enlarged faces of persons displayed in the still image F42. On the operation display screens of FIGS. 17A and 17B as well, performing operations (such as a pinch-in, a pinch-out, and a drag) on the operation display 130 functioning as the touch panel ensures performing operations such as enlargement/reduction and movement of the displayed images.

In this example, the display 131 shows that the still image F42 includes the feature image Q42, which displays the face of the daughter D, an extracted image F42c, which displays the face of the son C, and two extracted images F42a and F42b, which display faces of two other persons unregistered in the person registration data storage region 142. The three extracted images F42a, F42b, and F42c are extracted by the face detection process by the feature value operator 112 according to the change in the still image F42.

At Step S8551, the user performs a photographed person selection process. In the photographed person selection process, while referring to the face of the son C and the face of the daughter D, the user touches a scroll icon SC5 for change to the still image on the front side and a scroll icon SC6 for change to the still image on the back side in time series, thus ensuring changing the still image in the group. It is assumed in this example that the user selects the face of the daughter D and the face of the son C and touches a person selection icon M3 to fix the selection. The three extracted images F42a, F42b, and F42c are extracted and changed according to the change in the still image.

FIG. 17B illustrates an enlarged still image F42L produced by performing the print layout setting process on the still image F42. FIG. 17B further displays the extracted images F42a and F42b such that the removal of the extracted images F42a and F42b from a print target region as a region target for printing where the faces of the two other persons are set in the print layout is clear. The still image F42L employs the print layout in which the face of the daughter D and the face of the son C are selected but the faces of the two other persons are removed. The print layout setting process has been automatically performed on the still image F42L by the following method. The user touches an Adjust Layout M4 to ensure adjusting (changing) the print layout and touches a Change Orientations M5 to ensure changing the horizontal and vertical orientations of the L-size print.

At Step S8552, the control unit 110 performs a photographed person count process. In the photographed person count process, the control unit 110 counts the count of the selected faces as the count of photographed persons. At Step S8553, the control unit 110 determines whether the count of photographed persons is one or not. When the count of photographed persons is not one person, the control unit 110 advances the process to Step S8554, and when the count of photographed persons is one person, the control unit 110 advances the process to Step S8555.

FIG. 18 illustrates an example of the print layout setting process according to the fourth embodiment. FIG. 18 illustrates a still image F101 that displays faces of two persons H1 and H2 for description of easy understanding of the print layout setting process.

At Step S8554, the control unit 110 sets a rectangular shape encompassing all of photographed persons. Specifically, the control unit 110 automatically sets the rectangular shape as a bounding box BB1 encompassing the faces of all of the two persons H1 and H2 and the periphery.

FIG. 19 illustrates another example of the print layout setting process according to the fourth embodiment. FIG. 19 illustrates still images F102 and F103 that display a face of one person H3 for description of easy understanding of the print layout setting process. In the still image F102, both of the face and the visual line of the person H3 face a capturing direction, the direction of the photographer. In the still image F103, both of the face and the visual line of the person H3 face the left direction.

In the case of the count of photographed persons being one, the control unit 110 performs the print layout setting process based on the visual line direction of the photographed subject. At Step S8555, the control unit 110 performs a visual line direction estimation process. In the visual line direction estimation process, the control unit 110 can estimate the visual line direction employing the method, for example, well-known techniques.

The well-known techniques propose the method that analyzes a face image, that is, cuts out an image of an eye part from an image of a face part, extracts a feature value expressing location information of the eyes, and estimates a visual line direction based on a comparison of the feature value with a standard pattern. The feature value includes a density distribution of each of a horizontal direction and a vertical direction corresponding to pupils in the eye parts in a shading image.

At Step S8556, the control unit 110 arranges a space in the visual line direction and sets the print layout. In capturing photographs, a stable composition where a space is arranged in a visual line direction and a face direction of a photographed subject is generally employed. Thus, the control unit 110 sets the print layout according to the photographed subject direction, which is at least one of the directions of the direction of the visual line and the direction of the face, thereby ensuring automatically employing the stable composition.

In the still image F102, the control unit 110 automatically sets a rectangular shape as a bounding box BB2 encompassing the person H3 and the periphery in the still image F102. Since both of the face and the visual line of the person H3 face the direction of the photographer, the control unit 110 employs a composition equally enlarged from the bounding box BB2 in both side directions.

Meanwhile, in the still image F103, the control unit 110 automatically sets a rectangular shape as a bounding box BB3 encompassing the person H3 and the periphery in the still image F103. Since both of the face and the visual line of the person H3 face the left side direction, the control unit 110 employs a composition arranging a comparatively large space on the left side with respect to the bounding box BB3.

A ratio of a space arranged on the photographed subject direction side with respect to a space arranged on the side opposite to the photographed subject direction may be enlarged as the angle of the photographed subject direction with respect to the capturing direction becomes large. In the case of the count of persons is plural, when the photographed subject directions of the plurality of faces are the identical direction, a wide space may be arranged on the identical direction side.

At Step S8557, the control unit 110 performs a margin setting process. In the margin setting process, the control unit 110 automatically arranges general margins assumed when a person is captured with a camera and sets frames Fr1, Fr2, and Fr3. The frames Fr1, Fr2, and Fr3 are set assuming an aspect ratio of an L-size print (127 mm×89 mm) as the initial setting.

Since the aspect ratio of the moving image generally differs from the aspect ratio of the still image, a composition intended during capturing the moving image cannot be maintained in some cases when editing into the aspect ratio of the still image. Furthermore, both of the photographer and the photographed subject move in capturing the moving image in some cases, a capturing conscious of the composition is generally difficult.

Against such problem, in this embodiment, the control unit 110 can achieve an appropriate composition assumed when a person is captured with a still camera, automatically arrange the general margins, and set the frames Fr1, Fr2, and Fr3 to the L-size print. This ensures maintaining the composition intended when the moving image is captured and further performing an assistance such as a semi-automatic setting of a stable, preferable composition without conscious of the composition during capturing the moving image, thus ensuring reducing a burden of the user.

At Step S856 (see FIG. 14), the print setting process is performed. In the print setting process, the user sets the count of printed sheets and contents of the image process and touches a Complete Setting M6 (see FIG. 17B) to complete the print setting process.

At Step S857, the control unit 110 performs a printable sheet count update process. In the printable sheet count update process, the control unit 110 calculates a count of remaining printable sheets assuming that the printing process is performed on the still images whose settings have been completed. In this example, printing of the one still image F42L is set; therefore, the printable sheet count (count of remaining sheets) is updated from 16 sheets to 15 sheets on the display region RC, and the count of remaining scenes is updated from 18 to 17.

The control unit 110 performs processes from Step S851 to Step S857 on groups up to the last group as a first print target image selection process (Step S858). In this example, the count of remaining scenes is an unprocessed group count displayed after the group including the still image data selected as the target for the printing process.

Meanwhile, when the printable sheet count is equal to or more than the group count, the control unit 110 advances the process to Step S860 (see FIG. 13). At Step S860, the control unit 110 performs a second print target image selection process. The second print target image selection process differs from the first print target image selection process, which displays the representative still images in the order of the large average feature value, in that the second print target image selection process displays the representative still images in a time series order in each group.

With the printable sheet count equal to or more than the group count, the print output process is possible on at least one sheet per group; therefore, the control unit 110 can display the representative still images in the time series order in each group. In contrast to this, with the printable sheet count less than the group count, since the user desires the selection of the group on which the print output process is performed, the representative still images are displayed in the order of the large average feature value.

Furthermore, the control unit 110 can the printable sheet count (count of remaining sheets) and the count of remaining scenes on the display region RC in the operation display 130. This allows the user to smoothly select the group (scene). For example, when the printable sheet count is larger than the count of remaining scenes (remaining group count), the user can additionally select an image from each group again.

Generally, when the still image data is extracted from the moving image data, it is difficult to predict a count of extractions of the still images. For example, when a printing process is performed using an image forming apparatus installed in a convenience store or a similar store at a travel destination, since the count of extractions cannot be predicted, a burden to select a still image as a print target considering a fee to be paid is an overburden. This embodiment can reduce the burden to select the desired still image data from the plurality of still image data extracted from the moving image data.

At Step S870, the control unit 110 uses the image forming unit 120 according to pressing of the operation processing unit (start switch) 132 to form the image on a print medium. The print target is the still image data on which the print setting process has been completed at Step S856 (see FIG. 14).

The control unit 110 may immediately form the image on the print medium according to the completion of the print setting process. However, the above-described embodiment is advantageous in that the permission of canceling the print setting process ensures reselection of the still image data.

Thus, in the still image acquisition process according to the fourth embodiment, the scene (group) is selected while the state of the face of the photographed subject is checked among the still image data extracted from the moving image data, thereby ensuring smooth selection of the desired still image from the group.

The still image acquisition process according to the fourth embodiment further can perform the layout setting process with the automatically set appropriate composition considering the state of the photographed subject in the selected still image. Thus, the still image acquisition process according to the fourth embodiment can achieve the appropriate print output of the still image while reducing the burden of the user in the printing process using the moving image data.

E. Modification

In addition to the respective embodiments, the disclosure can also be embodied by the following modification.

While the embodiments apply the disclosure to the image forming apparatus, the disclosure is applicable to a device that functions as the image processing apparatus such as a smart phone and a personal computer.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus comprising:
    a still image data creation unit that performs a sampling from moving image data at a predetermined sampling period to create sampling target still image data; and
        a still image data extraction unit that calculates a first feature value of the sampling target still image data, determines whether the sampling target still image data is first extraction target still image data as an extraction target or not based on the first feature value, and calculates a second feature value of adjacent still image data, the adjacent still image data being a plurality of still image data in a range preset in time series of the first extraction target still image data, the still image data extraction unit determining whether the adjacent still image data is second extraction target still image data as an extraction target or not based on the second feature value, the still image data extraction unit extracting the first extraction target still image data and the second extraction target still image data; wherein
    the moving image data includes an I-frame, a P-frame, and a B-frame, the I-frame being encoded without performing an inter-frame prediction, the P-frame being encoded by the inter-frame prediction of the I-frame and the P-frame, the B-frame being encoded by the inter-frame prediction of the I-frame, the P-frame, and the B-frame; and
    the still image data extraction unit creates the still image data from the I-frame when the sampling target still image data is the I-frame, the still image data extraction unit creating the still image data from the I-frame immediately before the sampling target still image data in time series when the sampling target still image data is the P-frame or the B-frame.

2. The image processing apparatus according to claim 1, wherein the still image data extraction unit sets the range preset in the time series between the sampling target still image data immediately before the first extraction target still image data and the sampling target still image data immediately after the first extraction target still image data.

3. The image processing apparatus according to claim 1, wherein:
    the moving image data includes an I-frame, a P-frame, and a B-frame, the I-frame being encoded without performing an inter-frame prediction, the P-frame being encoded by the inter-frame prediction of the I-frame and the P-frame, the B-frame being encoded by the inter-frame prediction of the I-frame, the P-frame, and the B-frame; and
    the still image data extraction unit creates the still image data from the I-frame when the sampling target still image data is the I-frame, the still image data extraction unit creating the still image data from the I-frame and the P-frame used in the inter-frame prediction and the P-frame when the sampling target still image data is the P-frame, the still image data extraction unit creating the still image data from the I-frame, the P-frame, and the B-frame used in the inter-frame prediction and the B-frame when the sampling target still image data is the B-frame.

4. The image processing apparatus according to claim 1, wherein:
    the moving image data includes an I-frame, a P-frame, and a B-frame, the I-frame being encoded without performing an inter-frame prediction, the P-frame being encoded by the inter-frame prediction of the I-frame and the P-frame, the B-frame being encoded by the inter-frame prediction of the I-frame, the P-frame, and the B-frame; and
    the still image data extraction unit creates the still image data from the I-frame when the sampling target still image data is the I-frame, the still image data extraction unit creating the still image data from the I-frame and the P-frame used in the inter-frame prediction and the P-frame when the sampling target still image data is the P-frame, the still image data extraction unit creating the still image data from the I-frame or the P-frame immediately before the sampling target still image data in time series when the sampling target still image data is the B-frame.

5. The image processing apparatus according to claim 1, wherein the still image data creation unit creates a plurality of still image data from the moving image data, the still image data creation unit performing sampling at the predetermined sampling period to determine sampling target still image data among the plurality of still image data.

6. The image processing apparatus according to claim 1, further comprising:
    an operation display that accepts an input from a user; and
    a period setting unit that causes the operation display to display a screen accepting a period setting input as a setting of the predetermined sampling period.

7. The image processing apparatus according to claim 1, wherein the still image data extraction unit detects a candidate region as a region having a predetermined feature in the still image data, calculates a feature value of the at least one detected candidate region, and extracts the still image data including the candidate region having the feature value exceeding a predetermined threshold.

8. The image processing apparatus according to claim 7, wherein:
    the still image data extraction unit detects a plurality of candidate regions as the at least one candidate region; and when a sum of counts of pixels of the plurality of candidate regions exceeds a count of pixels of the still image data, the feature value is calculated targeting the whole still image data.

9. The image processing apparatus according to claim 7, wherein:
the predetermined feature includes a feature expressing a face of a human; and
the feature value quantitatively expresses a degree of reliability of being the face of the preliminary registered person.

10. The image processing apparatus according to claim 1, wherein a processing load of a process to detect the candidate region is smaller than a processing load to calculate the feature value.

11. An image forming apparatus comprising:
the image processing apparatus according to claim 1; and
an image forming unit that forms an image on a print medium.

12. An image processing method comprising:
performing a sampling from moving image data at a predetermined sampling period to create sampling target still image data;
calculating a first feature value of the sampling target still image data, determining whether the sampling target still image data is first extraction target still image data as an extraction target or not based on the first feature value;
calculating a second feature value of adjacent still image data, the adjacent still image data being a plurality of still image data in a range preset in time series of the first extraction target still image data;
determining whether the adjacent still image data is second extraction target still image data as an extraction target or not based on the second feature value; and
extracting the first extraction target still image data and the second extraction target still image data; wherein
the moving image data includes an I-frame, a P-frame, and a B-frame, the I-frame being encoded without performing an inter-frame prediction, the P-frame being encoded by the inter-frame prediction of the I-frame and the P-frame, the B-frame being encoded by the inter-frame prediction of the I-frame, the P-frame, and the B-frame; and
the still image data extraction unit creates the still image data from the I-frame when the sampling target still image data is the I-frame, the still image data extraction unit creating the still image data from the I-frame immediately before the sampling target still image data in time series when the sampling target still image data is the P-frame or the B-frame.

13. A non-transitory computer-readable recording medium storing an image processing program to control an image processing apparatus, the image processing program causing the image processing apparatus to function as:
a still image data creation unit that performs a sampling from moving image data at a predetermined sampling period to create sampling target still image data; and
a still image data extraction unit that calculates a first feature value of the sampling target still image data, determines whether the sampling target still image data is first extraction target still image data as an extraction target or not based on the first feature value, and calculates a second feature value of adjacent still image data, the adjacent still image data being a plurality of still image data in a range preset in time series of the first extraction target still image data, the still image data extraction unit determining whether the adjacent still image data is second extraction target still image data as an extraction target or not based on the second feature value, the still image data extraction unit extracting the first extraction target still image data and the second extraction target still image data; wherein
the moving image data includes an I-frame, a P-frame, and a B-frame, the I-frame being encoded without performing an inter-frame prediction, the P-frame being encoded by the inter-frame prediction of the I-frame and the P-frame, the B-frame being encoded by the inter-frame prediction of the I-frame, the P-frame, and the B-frame; and
the still image data extraction unit creates the still image data from the I-frame when the sampling target still image data is the I-frame, the still image data extraction unit creating the still image data from the I-frame immediately before the sampling target still image data in time series when the sampling target still image data is the P-frame or the B-frame.

* * * * *